United States Patent
Mehrotra et al.

(10) Patent No.: US 11,263,570 B2
(45) Date of Patent: Mar. 1, 2022

(54) GENERATING VISUALIZATIONS FOR INSTRUCTIONAL PROCEDURES

(71) Applicant: Rockwell Automation Technologies, Inc., Mayfield Heights, OH (US)

(72) Inventors: Abhishek Mehrotra, Milwaukee, WI (US); Hugo Bernardino Da Silva, Sao Paulo (BR); Richard S. Turk, Mayfield Village, OH (US); Timothy R. Brennan, Milwaukee, WI (US); Tyler L. Sheveland, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 261 days.

(21) Appl. No.: 16/687,462

(22) Filed: Nov. 18, 2019

(65) Prior Publication Data
US 2021/0150438 A1    May 20, 2021

(51) Int. Cl.
*G06Q 10/06*     (2012.01)
*G06F 16/248*    (2019.01)
(Continued)

(52) U.S. Cl.
CPC ..... *G06Q 10/06316* (2013.01); *G06F 16/248* (2019.01); *G06T 11/00* (2013.01); *G06T 13/80* (2013.01); *G06T 2200/24* (2013.01)

(58) Field of Classification Search
CPC ................................................ G06Q 10/06316
(Continued)

(56) References Cited

U.S. PATENT DOCUMENTS 9,589,372 B1 *   3/2017  Bean ................ G06K 9/00744
9,607,315 B1 *   3/2017  Worley, III ........ G06Q 30/0252
(Continued)

FOREIGN PATENT DOCUMENTS

DE     102015106470 A1    10/2016
EP         3318944 A2     5/2018
WO      2018/222756 A1    12/2018

OTHER PUBLICATIONS

Extended European Search Report for Application No. 20205170.2 dated Apr. 8, 2021, 8 pages.
(Continued)

*Primary Examiner* — Reza Nabi
(74) *Attorney, Agent, or Firm* — Fletcher Yoder, P.C.

(57) ABSTRACT

A system may include a processor and a memory. The memory may include computer-executable code that, when executed by the processor, causes the processor to retrieve a workflow dataset from a database based on a query input associated with an industrial automation device. The workflow dataset may include an instruction associated with one or more operations for the industrial automation device and a virtual object associated with the one or more instructions and the industrial automation device. The memory may include computer-executable code that, when executed by the processor, causes the processor to transmit a first portion of the workflow dataset to a computing device corresponding to a first instruction. The memory may include computer-executable code that, when executed by the processor, causes the processor to transmit a second portion of the workflow dataset to the computing device in response to determining that the first instruction is completed.

20 Claims, 16 Drawing Sheets

(51) Int. Cl.
*G06T 11/00* (2006.01)
*G06T 13/80* (2011.01)

(58) Field of Classification Search
USPC ....................................................... 705/7.26
See application file for complete search history.

(56) References Cited

U.S. PATENT DOCUMENTS

| | | | | |
|---|---|---|---|---|
| 10,335,677 | B2* | 7/2019 | Fuchs | A63F 13/69 |
| 10,360,735 | B1* | 7/2019 | Reeder | G06Q 30/016 |
| 10,699,483 | B2* | 6/2020 | Grossman | G02B 27/017 |
| 2012/0122570 | A1* | 5/2012 | Baronoff | A63F 13/79 |
| | | | | 463/31 |
| 2014/0207514 | A1* | 7/2014 | Domke | F02C 9/00 |
| | | | | 705/7.26 |
| 2015/0325047 | A1* | 11/2015 | Conner | G01C 21/36 |
| | | | | 345/633 |
| 2016/0176724 | A1* | 6/2016 | Ji | G06T 19/006 |
| | | | | 700/282 |
| 2016/0292925 | A1* | 10/2016 | Montgomerie | G09B 5/06 |
| 2017/0220863 | A1* | 8/2017 | Lection | G02B 27/0172 |
| 2017/0315721 | A1* | 11/2017 | Merel | G06F 3/04815 |
| 2018/0018825 | A1* | 1/2018 | Kim | G06F 3/0488 |
| 2018/0131907 | A1* | 5/2018 | Schmirler | G05B 23/0216 |
| 2019/0035171 | A1* | 1/2019 | Jayanthi | H04W 4/40 |
| 2019/0057548 | A1* | 2/2019 | Singh | G06K 9/6263 |
| 2019/0355177 | A1* | 11/2019 | Manickam | G02B 27/0172 |
| 2019/0392644 | A1* | 12/2019 | Keselman | G02B 27/017 |
| 2020/0050855 | A1* | 2/2020 | Jabara | G06K 9/4652 |
| 2020/0167712 | A1* | 5/2020 | Stracquatanio | G06F 3/012 |
| 2020/0201452 | A1* | 6/2020 | Luo | G06F 3/0304 |
| 2020/0216089 | A1* | 7/2020 | Garcia | B60K 35/00 |
| 2021/0019215 | A1* | 1/2021 | Neeter | G06Q 10/063112 |
| 2021/0054601 | A1* | 2/2021 | Bramberger | B33Y 30/00 |
| 2021/0074067 | A1* | 3/2021 | Kwon | G06F 3/16 |
| 2021/0149359 | A1* | 5/2021 | Mehrotra | G05B 19/4183 |
| 2021/0149889 | A1* | 5/2021 | Mehrotra | G06K 9/00671 |
| 2021/0150438 | A1* | 5/2021 | Mehrotra | G06Q 10/06316 |
| 2021/0202079 | A1* | 7/2021 | Friebe | G06F 16/9024 |
| 2021/0312606 | A1* | 10/2021 | Forster | G06T 7/60 |

OTHER PUBLICATIONS

Zubizarreta, Jon et al; "A framework for augmented reality guidance in industry;" The International Journal of Advanced Manufacturing Technology, vol. 102, No. 9; Mar. 6, 2019; 14 pages.

Huang, Zhanpeng et al; "Mobile augmented reality survey: a bottom-up approach;" http://arxiv.org/abs/1309.4413; Sep. 18, 2013, 35 pages.

Extended European Search Report for Application No. 20204534.0 dated Mar. 2, 2021, 11 pages.

Extended European Search Report for Application No. 20208353.1 dated Feb. 1, 2021, 7 pages.

U.S. Appl. No. 16/687,460, filed Nov. 18, 2019, Abhishek Mehrotra.

* cited by examiner

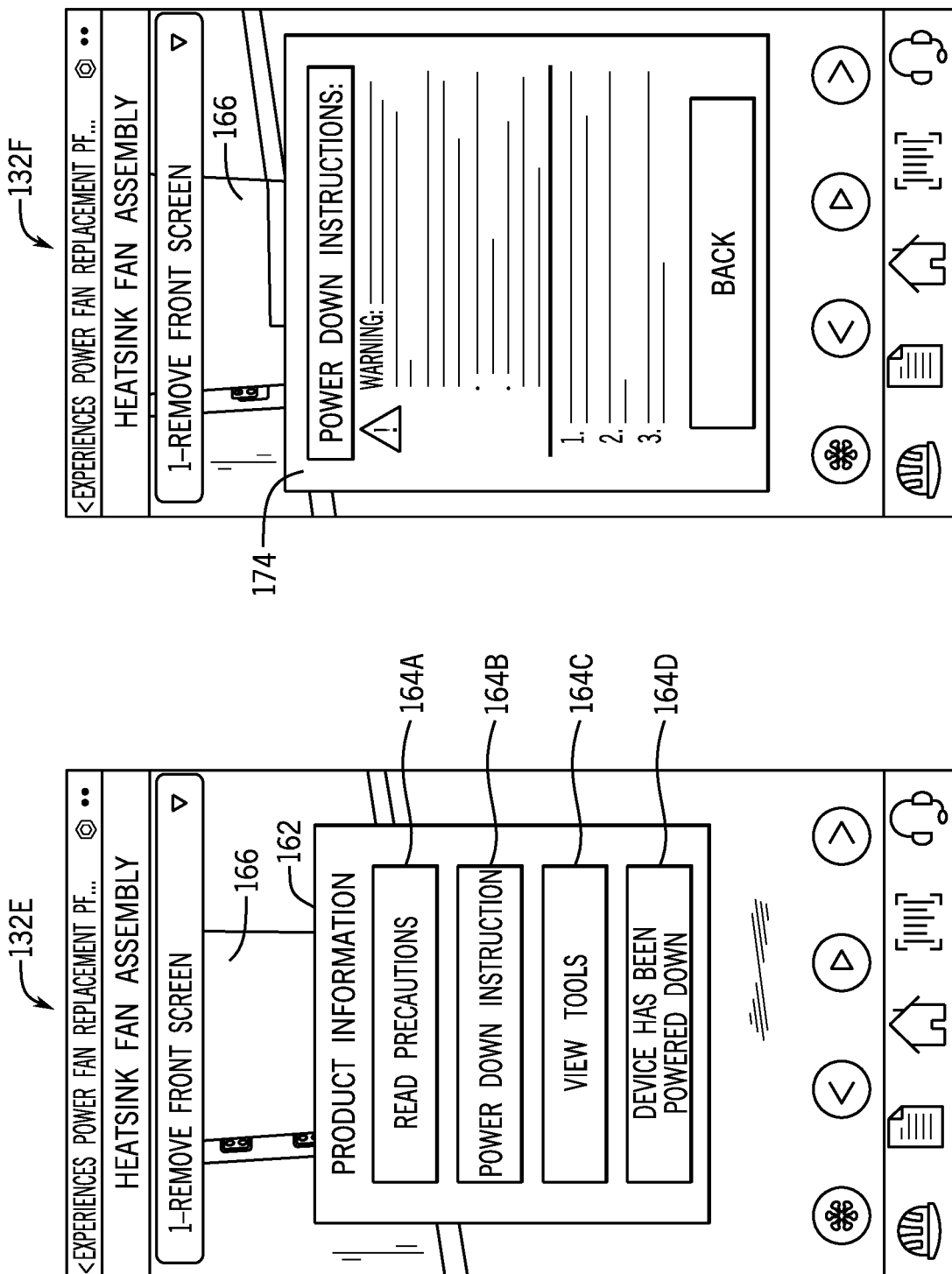

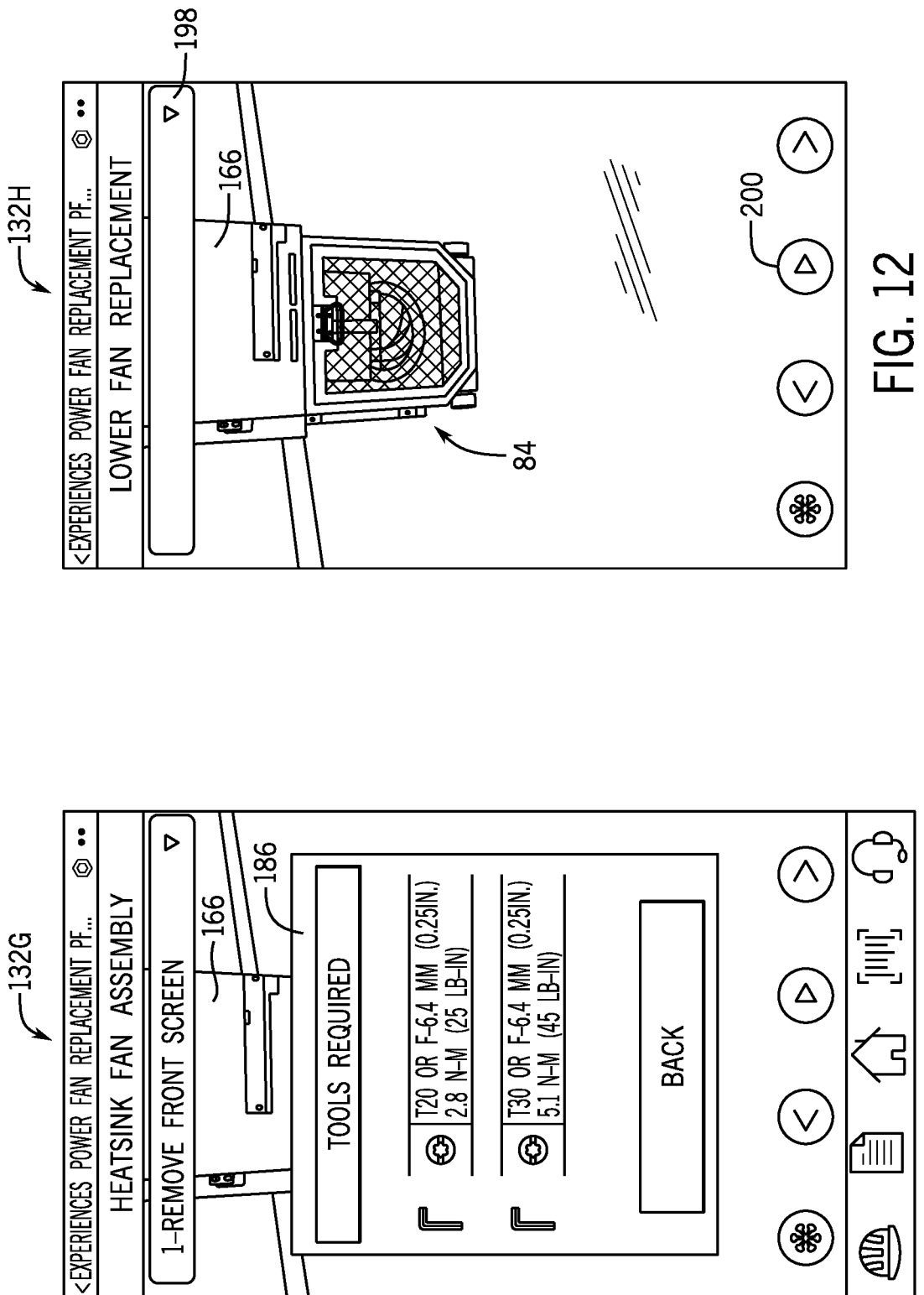

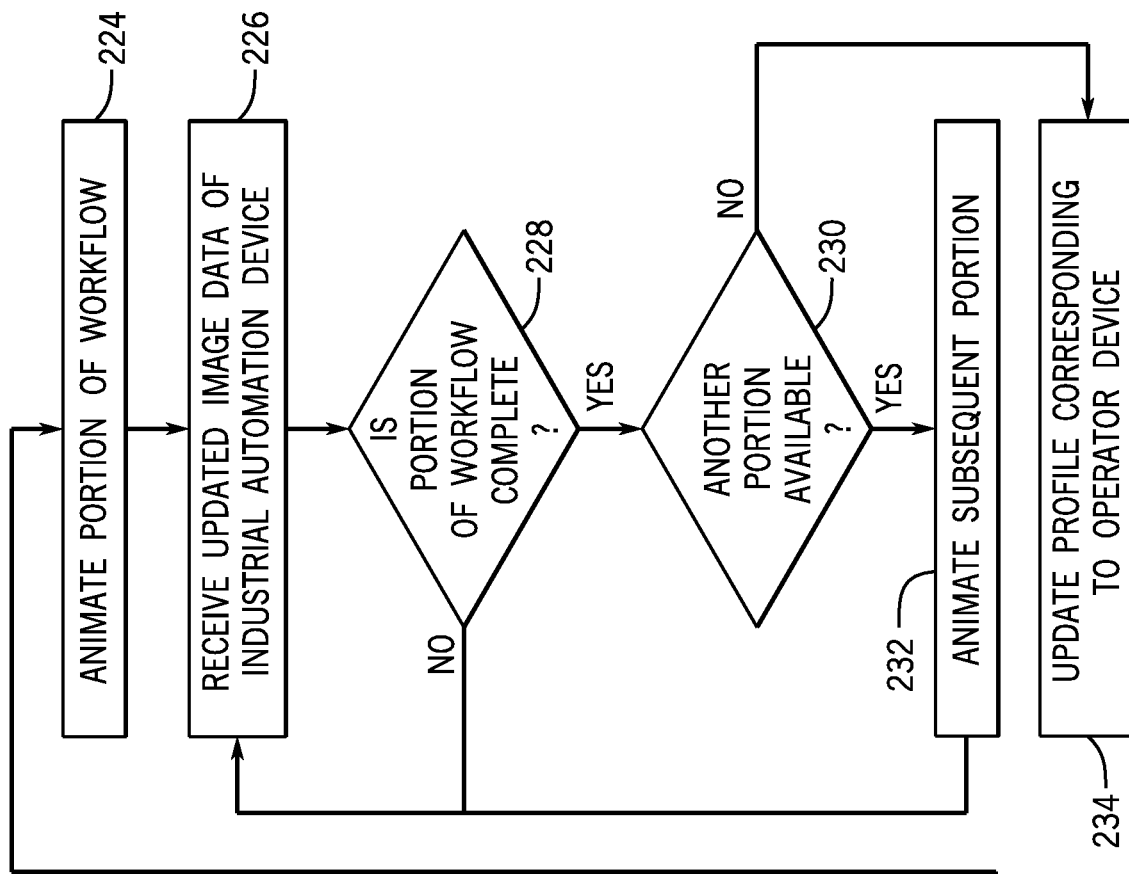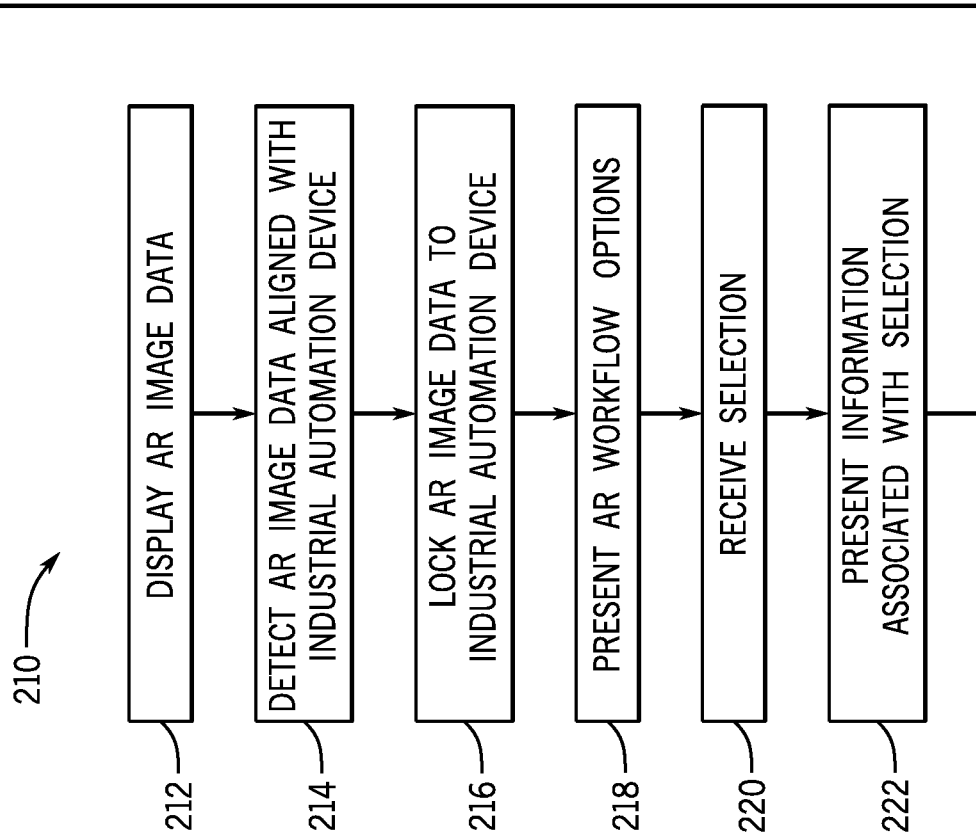
FIG. 13

GENERATING VISUALIZATIONS FOR INSTRUCTIONAL PROCEDURES

BACKGROUND

The disclosure relates generally to the design of industrial systems. More particularly, embodiments of the present disclosure are related to systems and methods for displaying or modifying visualizations associated with an industrial automation device or an industrial system based on detected user input.

Augmented reality (AR) devices provide layers of computer-generated content superimposed (e.g., overlaid) on a visualization of a real-world environment to a user via a display. That is, an AR environment may provide a user with a combination of real-world content and computer-generated content via the display. Augmented reality devices may include, for example, a head mounted device, smart glasses, a virtual retinal display, a contact lens, a computer, or a hand-held device, such as a mobile phone or a tablet. As AR devices become more widely available, these devices may be used to assist operators in industrial automation environments to perform certain tasks. As such, it is recognized that improved systems and methods for communicating to the operators how to perform certain operations in the real-world via the AR environment may better enable the operators to perform their job functions.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a processor and a memory. The memory may include computer-executable code that, when executed by the processor, causes the processor to retrieve a workflow dataset from a database based on a query input associated with an industrial automation device. The workflow dataset may include an instruction associated with one or more operations for the industrial automation device and a virtual object associated with the one or more instructions and the industrial automation device. The memory may include computer-executable code that, when executed by the processor, causes the processor to transmit a first portion of the workflow dataset to a computing device. The first portion of the workflow dataset may cause a presentation of a first animation of a first virtual object of the one or more virtual objects, and the first animation may correspond to performing a first instruction of the one or more instructions. The memory may include computer-executable code that, when executed by the processor, causes the processor to receive image data representative of the industrial automation device from an image sensor associated with the computing device and determine that a first operation corresponding to the first portion of the workflow dataset is performed based on the image data. The memory may include computer-executable code that, when executed by the processor, causes the processor to transmit a second portion of the workflow dataset to the computing device in response to determining that the first instruction is completed.

In another embodiment, a method may include retrieving, via a processor, a workflow dataset from a database based on a query input associated with an industrial automation device. The workflow dataset may include one or more instructions associated with one or more operations for the industrial automation device and one or more virtual objects associated with the one or more instructions and the industrial automation device. The method may include transmitting, via the processor, a first portion of the workflow dataset to a computing device. The first portion of the workflow dataset may present a first animation of a first virtual object of the one or more virtual objects, where the first animation may correspond to performing a first instruction of the one or more instructions. The method may include receiving, via the processor, image data representative of the industrial automation device from an image sensor associated with the computing device. The method may include determining, via the processor, that a first operation corresponding to the first portion of the workflow dataset is performed based on the image data. The method include transmitting, via the processor, a second portion of the workflow dataset to the computing device in response to determining that the first instruction is completed.

In yet another embodiment, a tangible, non-transitory computer-readable medium may store instructions executable by a processor of a computing device that, when executed by the processor, cause the computing device to perform operations including retrieving a workflow dataset from a database based on a query input associated with an industrial automation device. The workflow dataset may include one or more instructions associated with one or more operations for the industrial automation device and one or more virtual objects associated with the one or more instructions and the industrial automation device. The instructions, when executed by the processor, may cause the computing device to perform operations that include transmitting a first portion of the workflow dataset to a computing device. The first portion of the workflow dataset may cause a presentation of a first animation of a first virtual object of the one or more virtual objects, and the first animation may correspond to performing a first instruction of the one or more instructions. The instructions, when executed by the processor, may cause the computing device to perform operations that include receiving image data representative of the industrial automation device from an image sensor associated with the computing device and determining that a first operation corresponding to the first portion of the workflow dataset is performed based on the image data. The instructions, when executed by the processor, may cause the computing device to perform operations that include transmitting a second portion of the workflow dataset to the computing device in response to determining that the first instruction is completed.

DRAWINGS

These and other features, aspects, and advantages of the present disclosure may become better understood when the following detailed description is read with reference to the accompanying drawings in which like characters represent like parts throughout the drawings, wherein:

FIG. 9 is an illustration of an example visualization of information presented via the display of the electronic device of FIG. 3, in accordance with an embodiment;

FIG. 10 is an illustration of an example visualization of instructions presented via the display of the electronic device of FIG. 3, in accordance with an embodiment;

FIG. 11 is an illustration of an example visualization of a list of tools presented via the display of the electronic device of FIG. 3, in accordance with an embodiment;

FIG. 12 is an illustration of an example visualization of an augmented reality industrial component presented via the display of the electronic device of FIG. 3 using image data representative of real objects, in accordance with an embodiment;

FIG. 13 is a flowchart of a method for displaying the AR UX workflow via the electronic device of FIG. 3, in accordance with an embodiment;

Figure 3:
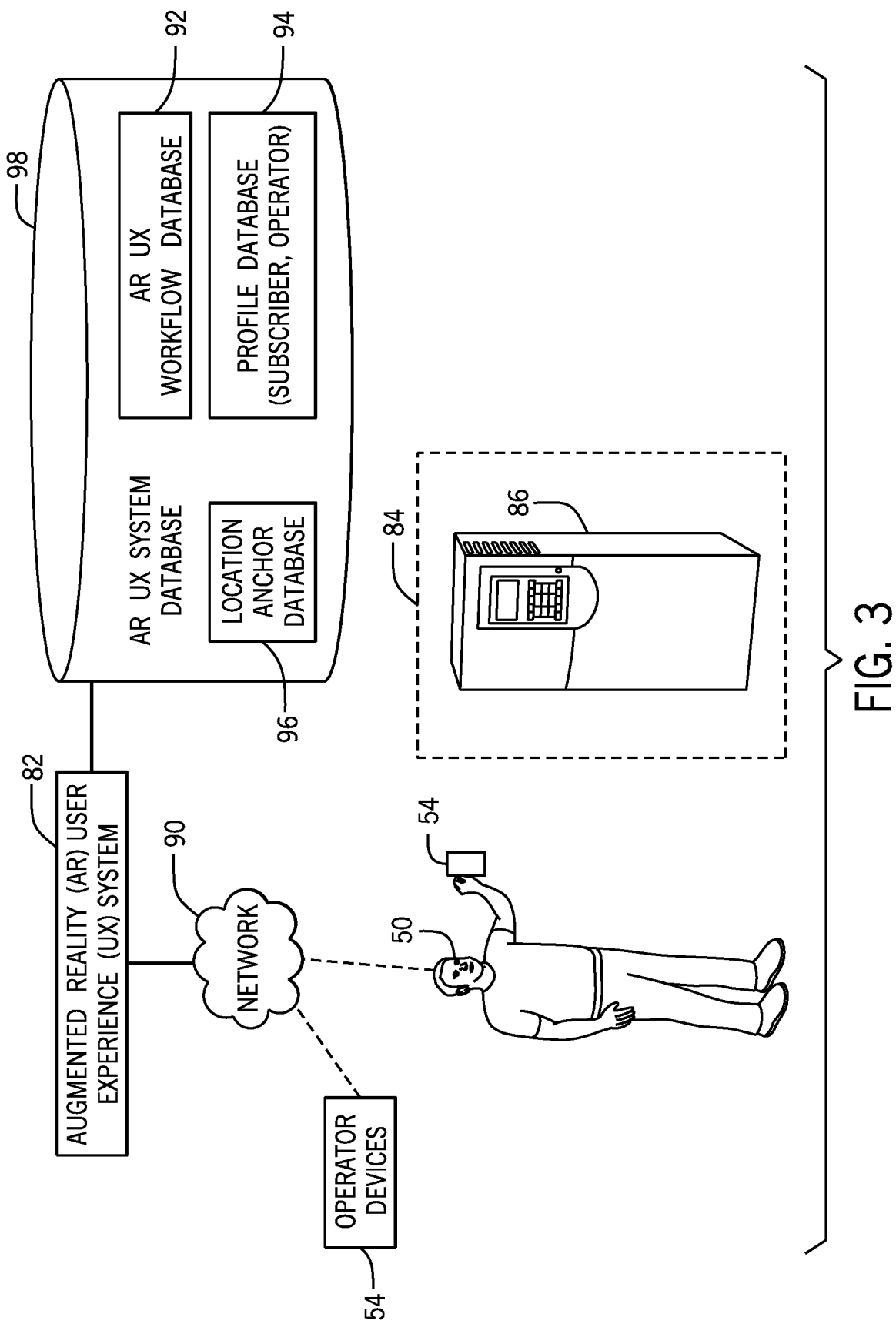
FIG. 3 is a block diagram of an electronic device receiving an augmented reality (AR) user experience (UX) workflow from an AR UX system, in accordance with an embodiment.
Figure 23:
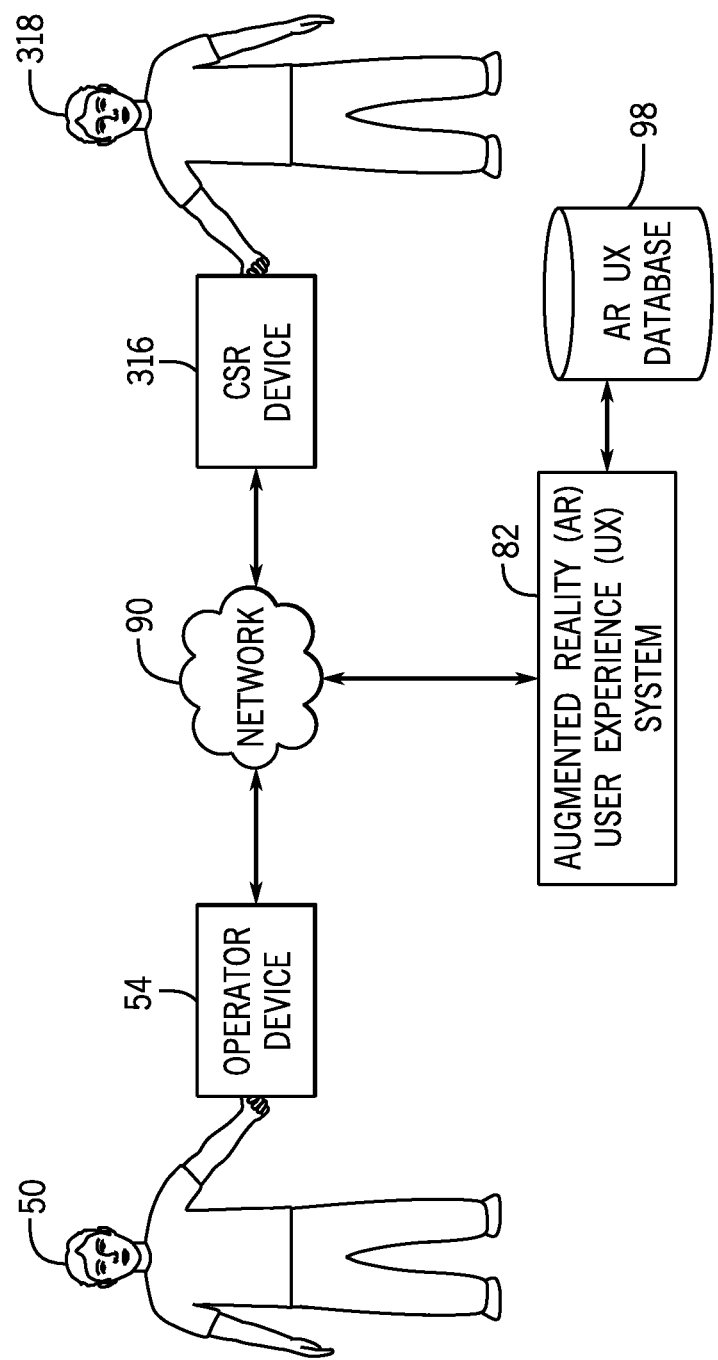
Figure 24:
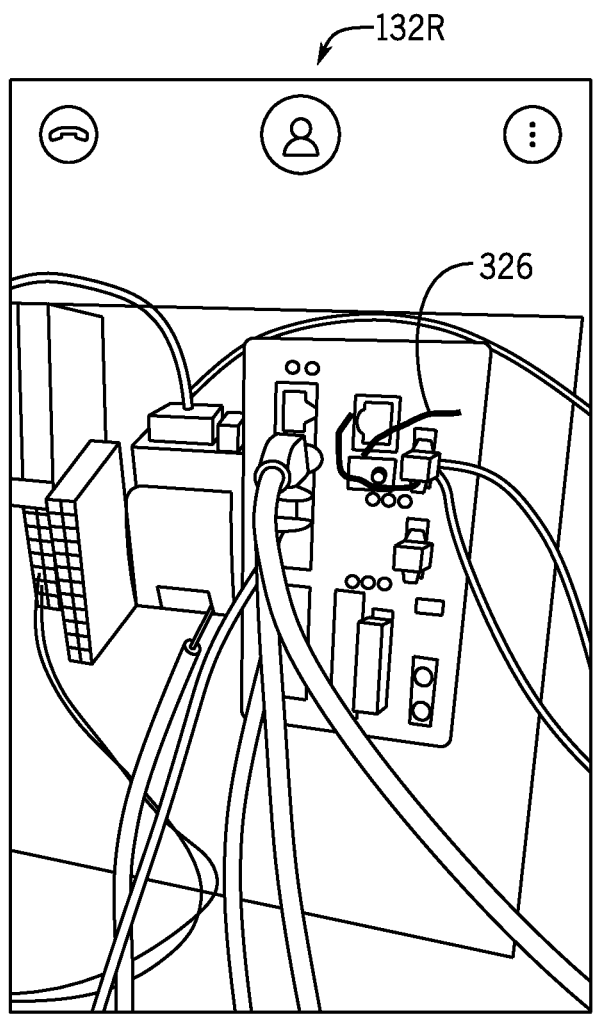

FIG. 23 is a block diagram of the electronic device of FIG. 3 receiving a modified AR UX workflow from an additional electronic device associated with a customer service representative, in accordance with an embodiment; and FIG. 24 is an illustration of an example visualization that depicts user input graphics presented via the display of the electronic device of FIG. 3, in accordance with an embodiment.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards an interactive augmented reality (AR) user experience (UX) system that may display one or more visualizations of a combination of real-world and computer-generated content in an AR environment to an operator. Operators of industrial automation systems may sometimes perform operations to industrial automation devices of the industrial automation system, such as maintenance activities and/or replacement activities. The visualizations may be of a portion of an industrial automation system and may help the operator when performing an operation to the portion of the industrial automation system. These operations may be performed in accordance with device-specific procedures (e.g., sequences of operations). For example, a first motor drive may be powered off using a procedure that is different from the procedure for a second motor drive due to the different components connected to each motor drive. The operator may be expected to memorize each of the device-specific procedures and/or reference hard copies of procedures while performing the operations. Even if the operator does not intermix procedures and devices, the operator may have a difficult time identifying individual portions of the industrial automation device that have changed or have been adjusted during the procedure. Thus, it may be desirable to provide an AR UX system for the operator to reference while performing operations to the industrial automation devices. The AR UX system may reduce a likelihood of operator error by presenting device-specific workflows to the operator when the operator is preparing to adjust operator of an industrial automation device. The AR UX system may also improve operations of the industrial automation system by reducing downtime of the industrial automation system for maintenance activities, for replacement activities and, and/or other suitable activities by improving operator confidence in performing operations on the industrial automation device.

Keeping this in mind, the AR UX system may generate one or more visualizations for arrangement and presentation as AR UX workflows. An AR UX workflow may include steps associated with performing various maintenance procedures or industrial operation activities by an operator via a computing device associated with the operator. That is, the computing device (e.g., mobile phone) may present a live image data stream (e.g., images captured in real-time from an image sensor of the device, video feed) of an industrial automation device and overlay instructions or information related to the industrial automation device on the image data stream. In some cases, the AR UX system may present one or more virtual objects that are overlaid into the image data stream. The virtual objects may be manipulated or animated as part of the AR UX workflow to show portions (e.g., steps, sequential operations) associated with the AR UX workflow. For example, the interactive AR UX system may guide an operator through a maintenance procedure by displaying or modifying one or more virtual objects in the visualization associated with the AR environment presented to the user. That is, the interactive AR UX system may depict a visualization indicative of a next component to remove a visualization representative of a next procedure operation being performed on the virtual object. For example, the AR UX system may render an animated visualization depicting a screw being removed from a virtual object that represents an enclosure to illustrate how a screen from an actual motor drive is removed. In some embodiments, modifying a visualization or modifying a virtual object in a visualization may include generating an additional visualization to depict the relevant instruction or action and displaying the additional visualization.

Although the AR UX workflow is described herein as including computer-generated content to be displayed via a visual modality on a display of the computing device, it should be noted that the AR UX workflow may provide computer-generated content via other types of sensory modalities. For example, the computer-generated content may be presented to a user via an auditory modality, a haptic modality, a somatosensory modality, an olfactory modality, or the like. Furthermore, the AR UX system may present instructions or may guide an operator while performing an operation through a combination of modalities, such as a combination of audible cues and visual cues, a combination of visualizations and haptic feedback, or the like. For example, when the AR UX system causes the operator device to render an image that is outside a current frame shown via the live image data stream, such as on a backside of an industrial device when the front of the industrial device is visible in the display of the operator device current frame, the AR UX system may provide directional haptic feedback to guide the operator to move the operator device to the area of the real-world corresponding to a location of the image being rendered (e.g., the backside of the industrial device).

In an example embodiment, the AR UX system may guide the operator using a combination of text and image cues presented on the computing device of the operator. In this way, while performing a maintenance activity on an example industrial automation device, such as powering off a component, the operator may receive step-by-step instructions according to the AR UX workflow regarding how to perform the maintenance activity on the industrial automation device (e.g., for the particular model and version of the drive). The AR UX system may present a visualization of the industrial automation device (e.g., virtual object) and manipulate the visualization of the industrial automation device to guide the operator through performance of the maintenance activity. For example, the AR UX system may sequentially show the operator a first location to check a status, a second location to disconnect a first switch, a third location to disconnect a second switch, and a fourth location to verify an electrical status of the drive used to verify the drive is powered off. In some cases, the AR UX system may identify a time that an operation for a current instruction was completed by the operator and, in response to the identification, the AR UX system may automatically advance to a subsequent instruction.

To access the AR UX workflow for a particular industrial automation device, the computing device of the operator may request access from an AR UX system that has access to an AR UX workflow database. The computing device may receive one or more AR UX workflows from the AR UX system if more than one AR UX workflows results from a query used by the AR UX system to search the AR UX workflow database. The computing device may transmit the selection to the AR UX system and receive the AR UX workflow corresponding to the selection for presentation to the operator via a display of the computing device.

Furthermore, in some embodiments, the computing device may receive one or more inputs from the operator specifying parameters for a query of the AR UX workflow database. For example, the inputs may specify parameters associated with a model type of the industrial automation device, a type of device associated with the industrial automation device, an environment that the industrial automation device is operated within, an operation type defining a particular kind of maintenance activity to be performed to the industrial automation device (e.g., replace component of industrial automation device, power off industrial automation device), or the like. The parameters may be applied to the query of the workflow database to narrow results of the query before presenting the results via the display to the operator.

Additionally or alternatively, the computing device of the operator may be associated with a profile. The profile may include parameters that correspond to or define an identity of the operator, an identity of the industrial automation system (e.g., a company that owns or operates the industrial automation system), or the like. The profile may be used by the AR UX system to pre-filter a query of the workflow database, such that a subset of workflows relevant to the industrial automation system and/or operator are searched by the AR UX system against the parameters. In some embodiments, the operator may input the parameters of the query into the computing device using drop-down menus, radio buttons, or the like, from a defined set of options. Thus, in some cases, the AR UX system may instruct the device to present a subset of options to the operator based at least in part on the profile corresponding to the operator. In this way, the operator is unable to select options that the profile of the operator is ineligible to select. The subset of options for parameters presented to the operator may be based on the profile. The profile may define permissions of the operator, such as operations or equipment that the operator is eligible to adjust. The profile may also include an indication of portions of the industrial automation system that the operator works within or devices that are included within the industrial automation system to filter irrelevant industrial automation devices out from the query. Profile filtering of the workflow database may improve a speed of the query used by the AR UX system when querying the workflow database based on parameters by reducing a subset of workflows that the AR UX system searches with the query. Moreover, profile filtering and other features described herein may reduce the amount of processing power employed by the AR UX system, thereby improving the operation of the AR UX system.

After the AR UX system transmits the AR UX workflow to the computing device for presentation to the operator, the computing device may automatically update visualizations presented via the display of the computing device to sequentially progress through the instructions of the procedure corresponding to the AR UX workflow. In some embodiments, the AR UX workflow may include messages or preliminary information. The computing device may present the messages and/or the preliminary information via the display before presenting the instructions via the display.

Furthermore, in some embodiments, the AR UX workflow may be simultaneously presented to two computing devices. For example, the operator may request customer service support associated with an operation to an industrial automation device. In response to the request, the AR UX system may provide a computing device of the operator and a computing device of a customer service representative a presentation of the same AR UX workflow. The same AR UX workflow being presented to both the operator and the customer service representative may improve an ability of the customer service representative to guide the operator through the procedure corresponding to the AR UX workflow. Furthermore, in some embodiments, the computing device of the customer service representative may receive an input to instruct generation of visualizations (e.g., manually entered visualizations) to be overlaid on the AR UX workflows. The overlaid visualizations may be rendered on the visualizations of the AR UX workflow, such that the computing device of the operator and the computing device of the customer service representative render the overlaid visualizations at a substantially similar time. In this way, the customer service representative may guide the operator through performing the procedure using visual indicators drawn in real-time on various portions of the AR UX workflow. Additional details regarding the interactive AR UX workflow and the AR UX system are described in more detail below with reference to FIGS. 1-24. It is noted, that as referred to herein, the AR UX workflow may be associated with an AR UX workflow dataset that includes information that enables a computing device to sequentially render AR UX visualizations that convey one or more AR UX workflow instructions.

Figure 1:
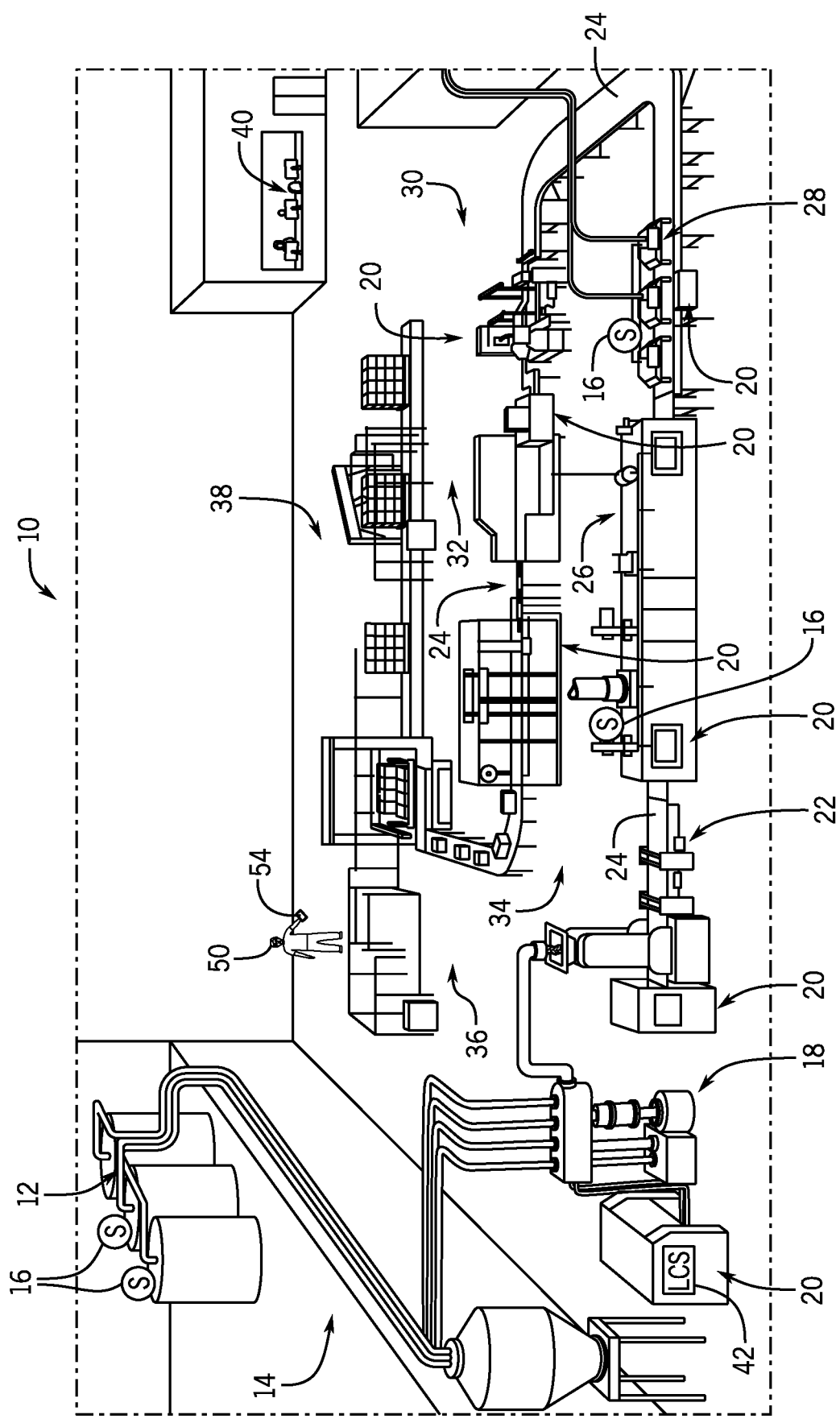
FIG. 1 is a perspective view of an example industrial automation system, in accordance with an embodiment.

By way of introduction, FIG. 1 is a perspective view of an example industrial automation system 10 employed by a food manufacturer. It should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation devices 20.

Figure 2:
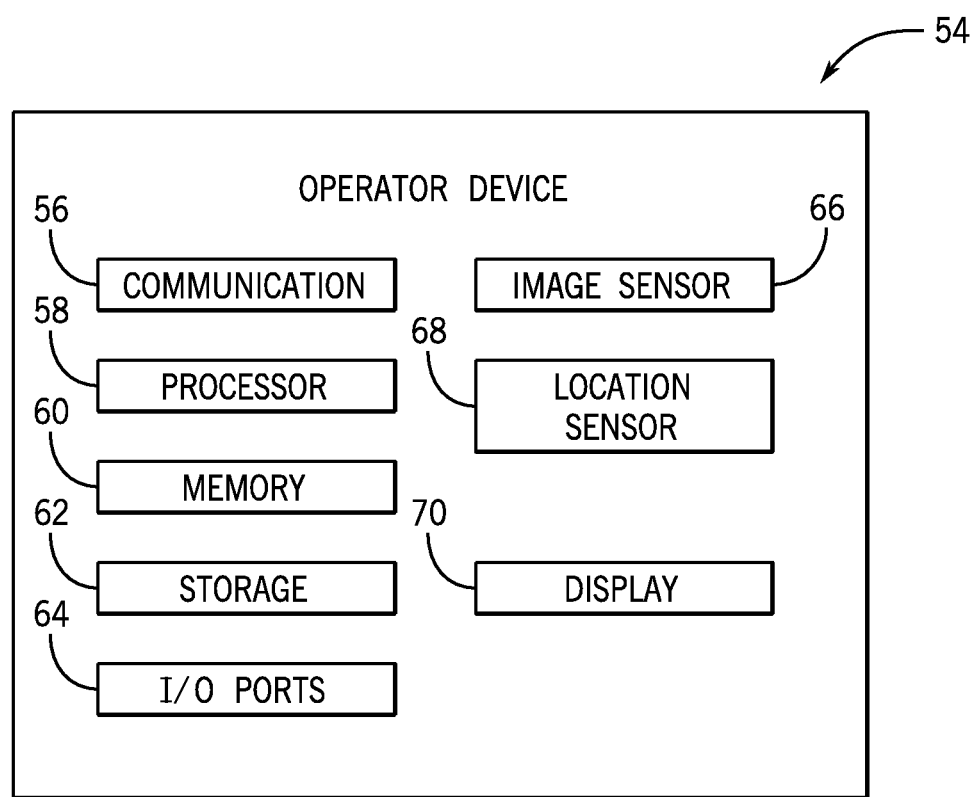
FIG. 2 is a block diagram of an industrial control system that operates a portion of the industrial automation system of FIG. 1, in accordance with an embodiment.

FIG. 2 is a block diagram of an operator device 54 that may be employed in any suitable industrial automation system 10 to access or interface with other industrial automation device 20 and/or computing devices. For example, the operator device 54 may include a communication component 56, a processor 58, a memory 60, a storage 62, input/output (I/O) ports 64, an image sensor 66 (e.g., a camera), a location sensor 68, a display 70, additional sensors (e.g., vibration sensors, temperature sensors), and the like. The communication component 56 may be a wireless or wired communication component that may facilitate communication between the industrial automation device 20, cloud-based computing systems, and other communication capable devices.

The processor 58 may be any type of computer processor or microprocessor capable of executing computer-executable code. The processor 58 may also include multiple processors that may perform the operations described below. The memory 60 and the storage 62 may be any suitable articles of manufacture that can serve as media to store processor-executable code, data, or the like. These articles of manufacture may represent computer-readable media (e.g., any suitable form of memory or storage) that may store the processor-executable code used by the processor 58 to perform the presently disclosed techniques. Generally, the processor 58 may execute software applications that include programs that enable a user to track and/or monitor operations of the industrial automation device 20 via a local or remote communication link. That is, the software applications may communicate with the operator device 54 and gather information associated with the industrial automation device 20 as determined by the operator device 54, via the sensors 16 disposed on the industrial automation device 20 and the like.

The memory 60 and the storage 62 may also be used to store the data, analysis of the data, the software applications, and the like. The memory 60 and the storage 62 may represent non-transitory computer-readable media (e.g., any suitable form of memory or storage) that may store the processor-executable code used by the processor 58 to perform various techniques described herein. It should be noted that non-transitory merely indicates that the media is tangible and not a signal.

In one embodiment, the memory 60 and/or storage 62 may include a software application that may be executed by the processor 58 and may be used to monitor, control, access, or view one of the industrial automation devices 20. The software application may enable the operator device 54 to perform various functionalities, such as track statistics of the industrial automation device 20, access reasons for placing the industrial automation device 20 offline stored by the local control system 42, and so forth.

The I/O ports 64 may be interfaces that couple to other peripheral components such as input devices (e.g., keyboard, mouse), sensors, input/output (I/O) modules, and the like. I/O modules may enable the computing device or other operator devices 54 to communicate with the industrial automation device 20 or other devices in the industrial automation system 10 via the I/O modules.

The image sensor 66 may include any image acquisition circuitry such as a digital camera capable of acquiring digital images, digital videos, or the like. The location sensor 68 may include circuitry designed to determine a physical location of the operator device 54. In one embodiment, the location sensor 68 may include a global positioning system (GPS) sensor that acquires GPS coordinates for the operator device 54.

The display 70 may depict visualizations associated with software or executable code being processed by the processor 58. In one embodiment, the display 70 may be a touch display capable of receiving inputs (e.g., parameter data for operating the industrial automation device 20) from a user of the operator device 54. As such, the display 70 may serve as a user interface to communicate with the industrial automation device 20. The display 70 may be used to display a graphical user interface (GUI) for operating the industrial automation device 20, for tracking the maintenance of the industrial automation device 20, and the like. The display 70 may be any suitable type of display, such as a liquid crystal display (LCD), plasma display, or an organic light emitting diode (OLED) display, for example. Additionally, in one embodiment, the display 70 may be provided in conjunction with a touch-sensitive mechanism (e.g., a touch screen) that may function as part of a control interface for the industrial automation device 20 or for a number of pieces of industrial automation equipment in the industrial automation system 10 to control the general operations of the industrial automation system 10. In some embodiments, the user interface may be characterized as a HMI, a human-interface machine, or the like.

Although the components described above have been discussed with regard to the operator device 54, it should be noted that similar components may make up other computing devices described herein, such as the local control system 42. Further, it should be noted that the listed components are provided as example components and the embodiments described herein are not to be limited to the components described with reference to FIG. 2. For example, other computing or control devices of the industrial automation system 10 may include one or more components that the operator device 54 includes.

To elaborate further on the operator device 54, FIG. 3 is a block diagram of the operator device 54 receiving an augmented reality (AR) user experience (UX) workflow dataset from an AR UX system 82, where the AR UX workflow dataset may include data corresponding to virtual objects (e.g., virtual products) as part of a series or sequence of sequential visualizations (e.g., AR UX workflow visualizations) to communicate sequentially presented instructions (e.g., AR UX workflow instructions) overlaid on real-time obtained and displayed images (e.g., image data feed) to communicate an operation or procedure (e.g., experience) to the operator 50 via dynamically generated instructions. Each AR UX workflow instruction of an AR UX workflow dataset may correspond to an AR UX visualization that may include one or more virtual objects, where one or more of the one or more virtual objects may be animated to convey or show steps for completing the AR UX workflow instruction. The AR UX workflow may be a 360-degree presentation to illustrate steps of a procedure to an operator 88, such that the AR UX workflow is presented via manipulation and/or emphasis of a virtual product depicted in a real-world location via an AR environment using image data representative of visualizations of industrial automation devices overlaid on image data representative of the real-world environment viewable by the operator device 54.

It is noted that the AR UX system 82 may be a computing device, hosted on a computing device, hosted on a cloud-computing device, or the like, and thus may include one or more components described with reference to the operator device 54 in FIG. 2. For example, the AR UX system 82 may include a processor 58 for performing operations and executing instructions stored in a memory 60. In this way, the processor 58 of the AR UX system 82 may retrieve an AR UX workflow dataset and initiate transmission of the AR UX workflow dataset to the operator device 54 via communication component 56 and/or I/O ports 64.

The operator device 54 may use the AR UX workflow dataset to render a visualization 84 that includes a virtual representation of an industrial automation device 86 (e.g., virtual industrial automation device, virtual product) in an augmented reality (AR) environment as an AR UX workflow visualization. In the illustrated embodiment, the AR environment may refer to the visualization 84 having a combination of computer-generated and real-world content displayed to the operator 50 via the operator device 54. Although a handheld operator device 54 is employed within the illustrated embodiment, it should be noted that, in other embodiments, other suitable types of displays or devices may be employed. For example, the operator device 54 may take the form of smart glasses, a virtual retinal display, one or more contact lenses, a computer, a mobile device, or any other suitable electronic display device for presenting AR UX workflow visualizations to the operator 50. In any case, the operator device 54 may display the visualization 84 that includes a virtual industrial automation device 86 to the operator 50 via the operator device 54. The visualization 84 may be superimposed computer-generated content (e.g., images or sounds) over real-world content (e.g., video, images or sounds) of the user's environment in real-time (e.g., used to present AR UX workflow visualizations indicative of AR UX workflow instructions).

In the illustrated embodiment, the operator device 54 may display a visualization 84 that includes a virtual representation of a motor drive 86. However, it should be noted that the illustrated embodiment is intended to be non-limiting and that the operator device 54 rendering the AR UX workflow dataset may display a visualization 84 that includes other virtual industrial automation devices, or parts thereof, that may be employed within an industrial system. For example, the industrial automation devices 20 may include controllers, input/output (I/O) modules, motor control centers, motors, valves, actuators, temperature elements, pressure sensors, HMIs, operator interfaces, contactors, starters, sensors, drives, relays, protection devices, switchgear, compressors, network switches (e.g., Ethernet switches, modular-managed, fixed-managed, service-router, industrial, unmanaged), data centers, conveyor sections, movers, and the like, and thus the AR UX workflow dataset may be used to present a procedure associated with any one of the above-listed devices or other suitable industrial devices.

The visualization 84 presented by the operator device 54 may be a portion of the AR UX workflow dataset. The operator device 54 may request the AR UX workflow dataset from the AR UX system 82 and obtain image data from the AR UX workflow dataset to present various visualizations 84 to the operator 50 via the operator device 54.

To obtain the image data, the operator device 54 may communicate with the AR UX system 82 through a network 90 and retrieve the image data of the AR UX workflow dataset based on input data. The network 90 may include any wired or wireless network that may be implemented as a local area network (LAN), a wide area network (WAN), and the like. It should be noted that any suitable network may be employed in the embodiments described herein. Indeed, other industrial communication network protocol, such as ETHERNET/IP®, CONTROLNET®, DEVICENET®, and the like, may also be used. In any case, the network 90 may permit the exchange of data in accordance with a protocol. For example, the network 90 may permit the transmission of the AR UX workflow dataset from the AR UX system 82 to the operator device 54.

Before a visualization representative of a AR UX workflow instruction may be presented via the operator device 54, a particular AR UX workflow dataset may be selected by the operator device 54 (e.g., by input from the operator 50). Selecting the AR UX workflow dataset may notify the AR UX system 82 to initiate a download of data corresponding to the selected AR UX workflow dataset to the operator device 54. To help select the AR UX workflow dataset, the AR UX system 82 may transmit an indication of available AR UX workflow datasets to the operator device 54, such that a selection of an AR UX workflow dataset may be made based on the available AR UX workflows. In this way, the AR UX system 82 may receive a request for an AR UX workflow from the operator device 54, determine available AR UX workflow datasets for presentation on the operator device 54, generate indications of the available AR UX workflows (e.g., a list of AR UX workflow titles), transmit the indications of the available AR UX workflow datasets to the operator device 54, receive a selection of one of the available AR UX workflow datasets via the operator device 54 selecting one of the indications, and transmitting at least a portion of data corresponding to the selected available AR UX workflow dataset to the operator device 54. Transmitting the selected available AR UX workflow dataset after the operator device 54 is presented with options for available AR UX workflow datasets may improve operation of the AR UX system 82 and/or the operator device 54 by reducing an amount of data transmitted between the AR UX system 82 and the operator device 54 when determining the selected available AR UX workflow.

The operator 50 may enter query parameters into the operator device 54 to initiate a search of AR UX workflow datasets. The AR UX system 82 may receive the query parameters from the operator device 54 and use the query parameters to search for available AR UX workflows relevant to the query parameters. Query parameters may specify a type of equipment, a type of operator, a unit of the industrial automation system 10, or the like to further specify the operation that the operator 50 desires in an AR UX workflow to use to help perform a respective task. The AR UX system 82 may use the query parameters to filter through AR UX workflow datasets stored in an AR UX workflow database 92. AR UX workflow datasets determined relevant based on the query parameters may be transmitted to the operator device 54 as the available AR UX workflow datasets from which the operator selects.

The AR UX system 82 may also perform additional filtering before querying the AR UX workflow database 92. The additional filtering may reduce a number of workflows to be searched via the query. The AR UX system 82 may reference stored profiles to determine a subset of AR UX workflow datasets that are relevant to be queried. For example, a profile may include information about a permission or skill level of the operator 50, such that if the operator 50 is not trained on an industrial automation device 20 or is otherwise unpermitted to adjust operation of the industrial automation device 20, the AR UX system 82 may not query AR UX workflow datasets related to the industrial automation device 20 since those AR UX workflow datasets may be irrelevant to the operator 50. The AR UX system 82 may also filter AR UX workflow datasets based on profiles for the industrial automation system 10. In this way, a profile for the industrial automation system 10 may store indications of related equipment (e.g., part of an overall system), model numbers of the related equipment, operational preferences for the related equipment, or the like for the industrial automation system 10. Thus, when any operator device 54 of the industrial automation system 10 requests an AR UX workflow, the AR UX system 82 may query AR UX workflow datasets associated with equipment related or operations performed by the industrial automation system 10 without querying AR UX workflow datasets associated with equipment unrelated or operations not performed by the industrial automation system 10. Profiles may be stored in a profile database 94 accessible by the AR UX system 82.

The AR UX system 82 may also filter the AR UX workflow datasets based at least in part on location anchors. A location anchor may be a device (e.g., industrial automation device 20) disposed at a known location with the industrial automation system 10. Using location information to perform filtering may enable the AR UX system 82 to query a subset of AR UX workflow datasets that are associated with industrial automation devices 20 that are located closer to or within a threshold distance from the operator device 54.

Location anchors may be used to determine a location of the operator device 54 based on the location of the operator device 54 relative to one or more location anchors. For example, time-of-flight calculations may be used to associate distances between a location anchor and the operator device 54 to a duration of time used to transmit a locating signal between the operator device 54 and a location anchor. In this way, the operator device 54 may transmit a first signal to a location anchor at a first time and receive a second signal from the location anchor at a second time. The operator device 54 may determine a duration of time between the first time and the second time and may correlate the duration of time to the location of the operator device 54. In some embodiments, the location sensor 68 may use Global Positioning System (GPS) information to locate the operator device 54 within the industrial automation system 10.

When a location of the operator device 54 is known, the AR UX system 82 may not query portions of the AR UX workflow database 92 that correspond to devices disposed a threshold distance away from the operator device 54. Industrial automation devices 20 disposed a distance greater than the threshold distance away from the operator device 54 may be unlikely to be selected by the operator 50 and/or may be considered irrelevant for purposes of querying AR UX workflow datasets. Location anchors may be stored in a location anchor database 96. Each of the databases 92, 94, 96 may be part of a AR UX system database 98 accessed by the AR UX system 82 when performing operations to provide the operator device 54 with an AR UX workflow dataset.

The operator device 54 may determine its own location (and transmit its location to the AR UX system 82) and/or the AR UX system 82 may determine the location of the operator device 54. After the AR UX system 82 has the location of the operator device 54, the AR UX system 82 may search for industrial automation devices 20 within a same region as the operator device 54 or within a threshold number of regions adjacent to a region that the operator device 54 is disposed. The AR UX system 82 may query the AR UX system database 98 to find AR UX workflow datasets that correspond to the industrial automation devices 20 determined to be within regions suitably near to the operator device 54 (e.g., within the same region, within a threshold number of regions from the operator device 54). The AR UX system 82 reducing a set of AR UX workflows datasets to be queried before querying the AR UX workflow database 92 may improve an efficiency of the query and make the querying operation take relatively less time than without filtering of the AR UX workflow datasets.

In addition to improving the query of the AR UX system database 98, the location of the operator device 54 may be used by the AR UX system 82 to identify industrial automation devices 20 and/or other features in an image captured by the image sensor 66 of the operator device 54. In this way, the AR UX system 82 may use the captured image data received from the operator device 54 to identify devices (e.g., industrial automation devices 20, other suitable identifiable devices within an industrial automation system 10) in the captured image data. When the AR UX system 82 identifies the devices in the captured image data, the AR UX system 82 may send information associated with the identified devices to the operator device 54. For example, the operator 50 may desire to view AR UX workflow instructions for an industrial automation device 20 and may initiate the query by capturing a photograph of the industrial automation device 20. The operator device 54 may transmit the image data corresponding to the photograph to the AR UX system 82. The AR UX system 82 may receive the image data and use image processing operations to identify and match the image data of the industrial automation device 20 to known industrial automation devices 20 of the particular industrial automation system 10 (e.g., identified in the profiles stored in the profile database 94). Once a match is determined, the AR UX system 82 may transmit information corresponding to the now-identified industrial automation device 20 to the operator device 54 for reference by the operator 50. For example, in response to matching the image data of the industrial automation device 20 to data stored in the AR UX system database 98, the AR UX system 82 may transmit information to the operator device 54, such as AR UX workflow dataset corresponding to the industrial automation device 20. In this way, the AR UX system 82 and/or the operator device 54 may receive image data from the image sensor 66 of a likeness of the industrial automation device 20, may compare the image data to stored image data (e.g., image data stored in AR UX database 98) corresponding to industrial automation products of the industrial automation system 10, and may determine the industrial automation device 20 to be one of the industrial automation products based at least in part on the image data matching the stored image data (e.g., matching based on an amount of matching or substantially similar image data being greater than a threshold amount of matching data).

In some cases, the AR UX system 82 may receive an indication of the AR UX workflow dataset to transmit to the operator device 54 from the operator device 54 as opposed to query parameters. The operator device 54, for example, may scan a link, a barcode (e.g., a QR code, a matrix barcode), or a radio frequency identification tag (RFID tag), or the like, presented on the industrial automation device 20 to retrieve the AR UX workflow dataset corresponding to the industrial automation device 20. For example, the links, barcodes, or the like may include a code acquired via a scanner, a barcode acquired via the scanner, a digital link to a website. Furthermore, in some cases, the AR UX system 82 may access maintenance schedules or the like for the industrial automation device, and may automatically retrieve the corresponding AR UX workflow dataset to an upcoming or overdue maintenance procedure for transmission to the operator device 54. The above-described features and more are discussed below with reference to interactions between the operator device 54 and the AR UX system 82, such as to select and provide data associated with an AR UX workflow dataset.

Figure 4:
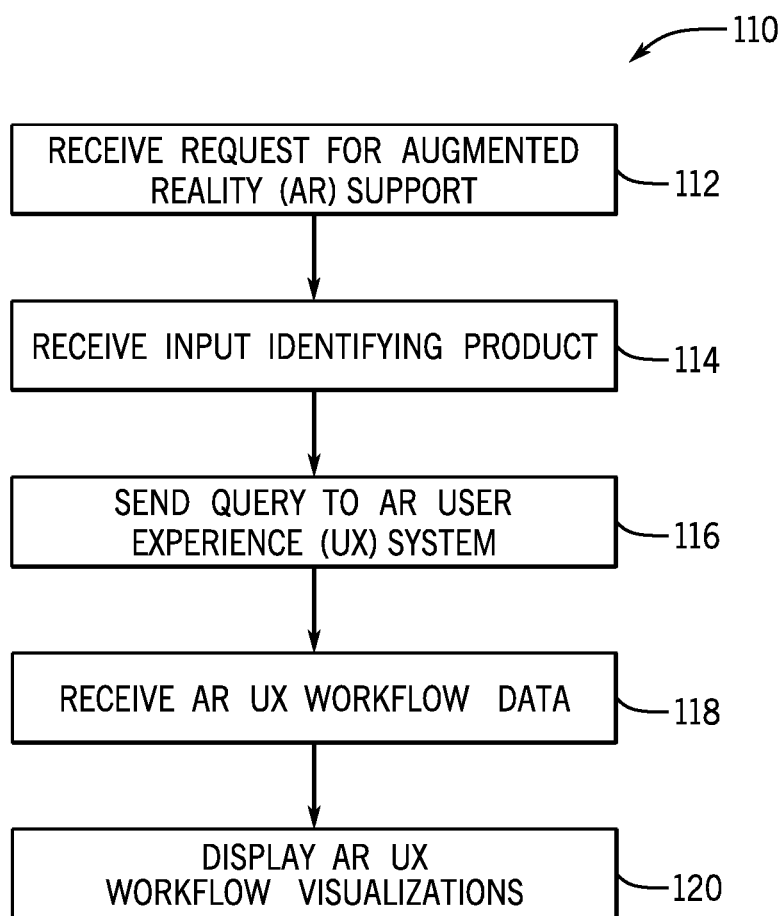
FIG. 4 is a flowchart of a method for operating the electronic device of FIG. 3 to receive and display the AR UX workflow, in accordance with an embodiment.

To elaborate on AR UX workflow selection operations, FIG. 4 is a flowchart of a method 110 performed by the operator device 54 to receive and display an AR UX workflow visualization. Although the method 110 is described below as performed by the operator device 54, it should be noted that the method 110 may be performed by any suitable processor that presents AR UX workflow visualizations. Moreover, although the following description of the method 110 is described in a particular order, it should be noted that the method 110 may be performed in any suitable order.

At block 112, the operator device 54 may receive a request for augmented reality (AR) support. The request may be generated in response to an application running or being opened on the operator device 54. In some cases, the request may be generated in response to receiving or detecting an audio command, such as a voice command from the operator 50. When the operator device 54 receives the request for AR support, the operator device 54 may launch a graphical user interface (GUI) that enables the operator 50 to enter query parameters that the AR UX system uses to retrieve AR UX workflow datasets from the AR UX system database 98. Query parameters may include inputs that identify a product, a product type (e.g., product line), a desired operation to be illustrated via the AR UX workflow visualizations, or the like.

In this way, at block 114, the operator device 54 may receive an input identifying a product, a product type (e.g., product line), a desired operation to be illustrated via the AR UX workflow (e.g., a desired experience), or the like. Thus, the input may include information to help narrow presented AR UX workflow datasets from which the operator 50 selects. The product may be an industrial automation device 20 to be operated on by the operator 50. Examples of product types may include a category designation, such as motor drive, controller, valve, positioner, or the like. Examples of the products may include specific examples of motor drives, such as a designated frame or model number, or specific models of the product types. Examples of the desired experiences may include preventive maintenance operations, lock-out/tag-out operations, start-up operations, part replacement operations, or the like. Desired experiences may specify the type of operation that the operator is to perform to the specified product and/or product type. For example, an experience may correspond to a maintenance procedure that includes instructions (e.g., verbal cues, written cues) that, when presented sequentially, increase a likelihood that equipment operated on will suitably work or operate as expected (e.g., as in accordance with an original operational intent). Experiences may correspond to procedures used to power-off or shutdown equipment (e.g., industrial automation devices 20) within an industrial automation system 10, such as to electrically disconnect the equipment from a power supply. Experiences may correspond to procedures used to power-on equipment (e.g., industrial automation devices 20) within an industrial automation system 10, such as to electrically connect the equipment to a power supply. Some experiences may be performed as part of preventive maintenance operations (e.g., operations performed before or in anticipation of equipment malfunction or undesired operation), as part of responsive maintenance operations (e.g., operations performed in response to an equipment malfunction or undesired operation), or the like. Generally, an AR UX workflow may involve presenting AR UX workflow visualizations based on AR UX workflow data (e.g., datasets) to convey or communicate AR UX workflow instructions to an operator to guide the operator through performance of a product-specific experience (e.g., operation performed to equipment of an industrial automation system 10, a device-specific experience, an industrial automation device-specific experience). In this way, since the AR UX workflow visualizations provide product-specific AR UX workflow instructions, inputs identifying the product, product type, desired experience, or the like may be used to query and identify a relevant subset (e.g., one or more) of the AR UX workflow datasets to be transmitted to the operator device 54 for use in presenting the AR UX workflow visualizations to the operator 50.

In some embodiments, the operator device 54 and/or the AR UX system 82 may receive inputs identifying a product based on a location of the operator device 54, such as a location determined via the location sensor 68, a location determined using location anchors, or the like. The operator device 54 and/or the AR UX system 82 may also receive an input identifying the product based at least in part on the operator device 54 scanning a code, a barcode, following a link, or the like to the identifying information. In some embodiments, the industrial automation device 20 may transmit its identifying information to the operator device 54, such as in response to the operator device 54 being within a defined proximity to the industrial automation device 20 and/or in response to the operator device 54 requesting the identifying information from the industrial automation device 20. For example, in some embodiments, the industrial automation device 20 may determine a time at which a particular maintenance activity is to be performed on itself and may push a notification to the operator device 54 and/or a wearable computing device of the operator 88 (e.g., smart watch) to notify the operator 88 of the due maintenance activity.

The operator device 54 and/or the AR UX system 82 may additionally or alternatively use detected habits and/or predictive models to determine which AR UX workflow is to be requested. For example, the AR UX system 82 may determine and reference a stored maintenance pattern for a particular industrial automation device 20. The stored maintenance pattern may define a regular repetition or periodicity to be used to identify a time at which a maintenance operation is to be performed. For example, the stored maintenance pattern may define that a calibration operation to an industrial automation device is to be performed every thirty days. A variety of suitable maintenance operations and/or durations of time may be stored as a stored maintenance pattern. Using the stored maintenance pattern, the AR UX system 82 may determine that the operator device 54 is expected to request data associated with the AR UX workflow corresponding to the particular industrial automation device 20 at the current time since the current time corresponds to a next operation time of the stored maintenance pattern. Furthermore, in some embodiments, the operator device 54 and/or the AR UX system 82 may receive the input identifying the product based at least in part on image recognition processes that analyze image data of the operator device 54 to detect which product is of interest.

At block 116, the operator device 54 may use the input identifying the product to generate and send a query to the AR UX system 82. The AR UX system 82 may receive the query and use information of the query (e.g., input parameters of product type, product, desired experience) to search the AR UX system database 98. The query may result in the AR UX system 82 identifying a subset of AR UX workflow datasets that are relevant to the input received by the operator device 54. AR UX workflows may be associated with data, including image data, used by the operator device 54 to present visualizations of steps related to a procedure to perform various types of tasks. Visualizations associated with a respective AR UX workflow dataset may be rendered via a display of the operator device 54 to generate a graphical user interface and to provide overlaid images that communicate safety information, tools, lock-out/tag-out (e.g., electrical isolation) information, procedure steps, or the like to the operator 50 preparing to operate or actively operating on the industrial automation device 20.

In some embodiments, the AR UX system 82 may query the AR UX system database 98 based on a profile from the profile database 94 and/or based on a location of the operator device 54 in addition to querying the AR UX system database 98 based on the input received by the operator device 54. Querying based on the profile may provide a filtered subset of AR UX workflow datasets even more tailored to the operator device 54, since the additional query may enable omission of AR UX workflow datasets that are irrelevant to the operator 50 based on the permission level of the operator 50, a subscription level of the industrial automation system 10, equipment of the industrial automation system 10, or the like. Furthermore, filtering based on the location of the operator device 54 may help provide a filtered subset of AR UX workflow datasets tailored to a location of the operator device 54, such that AR UX workflow datasets related to equipment at some distance from the operator device 54 (e.g., a threshold distance from the location of the operator device 54) are excluded from the subset of AR UX workflow datasets resulting from the query. When the subset of the AR UX workflow datasets (or the filtered subset of the AR UX workflow datasets) is prepared by the AR UX system 82, the AR UX system 82 may transmit data associated with the subset of the AR UX workflow datasets to the operator device 54.

At block 118, the operator device 54 may receive the AR UX workflow datasets from the AR UX system 82. In some cases, the query results in one AR UX workflow dataset, thus the operator device 54 may receive data for one AR UX workflow dataset. However, in some cases, the query results in multiple AR UX workflow dataset options. In these cases, the operator device 54 may receive indications of the multiple AR UX workflow dataset options and provide a selection from the multiple options to the AR UX system 82 before downloading the data for the selected AR UX workflow dataset. It is noted that in some cases, data for multiple AR UX workflow datasets is transmitted to the operator device 54 and any unselected workflows from the multiple AR UX workflow datasets are discarded by the operator device 54.

At block 120, the operator device 54 may display an AR UX workflow visualization 84 via the display 70. The operator device 54 may use image data of the AR UX workflow dataset to generate overlaid instructions and/or visualizations 84 associated with the selected experience type. For example, the operator device 54 may generate a visualization 84 of a motor drive according to the AR UX workflow dataset. The AR UX workflow dataset may also define additional operations to perform to the motor drive to execute the selected experience, such as individual instructions to power off the motor drive, replace components of the motor drive, or the like. These additional operations may be communicated to the operator 50 by sequentially modifying the visualization 84 at each instruction to mimic the physical change to the motor drive that is to occur in the real-world (e.g., non-virtual world).

FIGS. 5-12 depict various examples of graphical user interfaces presented by the operator device 54 via the display 70. To facilitate discussion, operations of FIG. 4 are referred to in the following discussion. It is noted that, as described herein, the operator device 54 visually renders the image data of the AR UX workflow dataset for reference by the operator 50, however it should be understood that any combination of indications may be used with the AR UX workflow visualizations to provide guidance via the operator device 54 (e.g., to provide AR UX workflow instructions). For example, the operator device 54 may be used in conjunction with noise canceling headphones or earplugs, such that verbal instructions or audible cues may be presented to the operator 50 via the AR UX workflow visualizations.

Figures 5, 6:
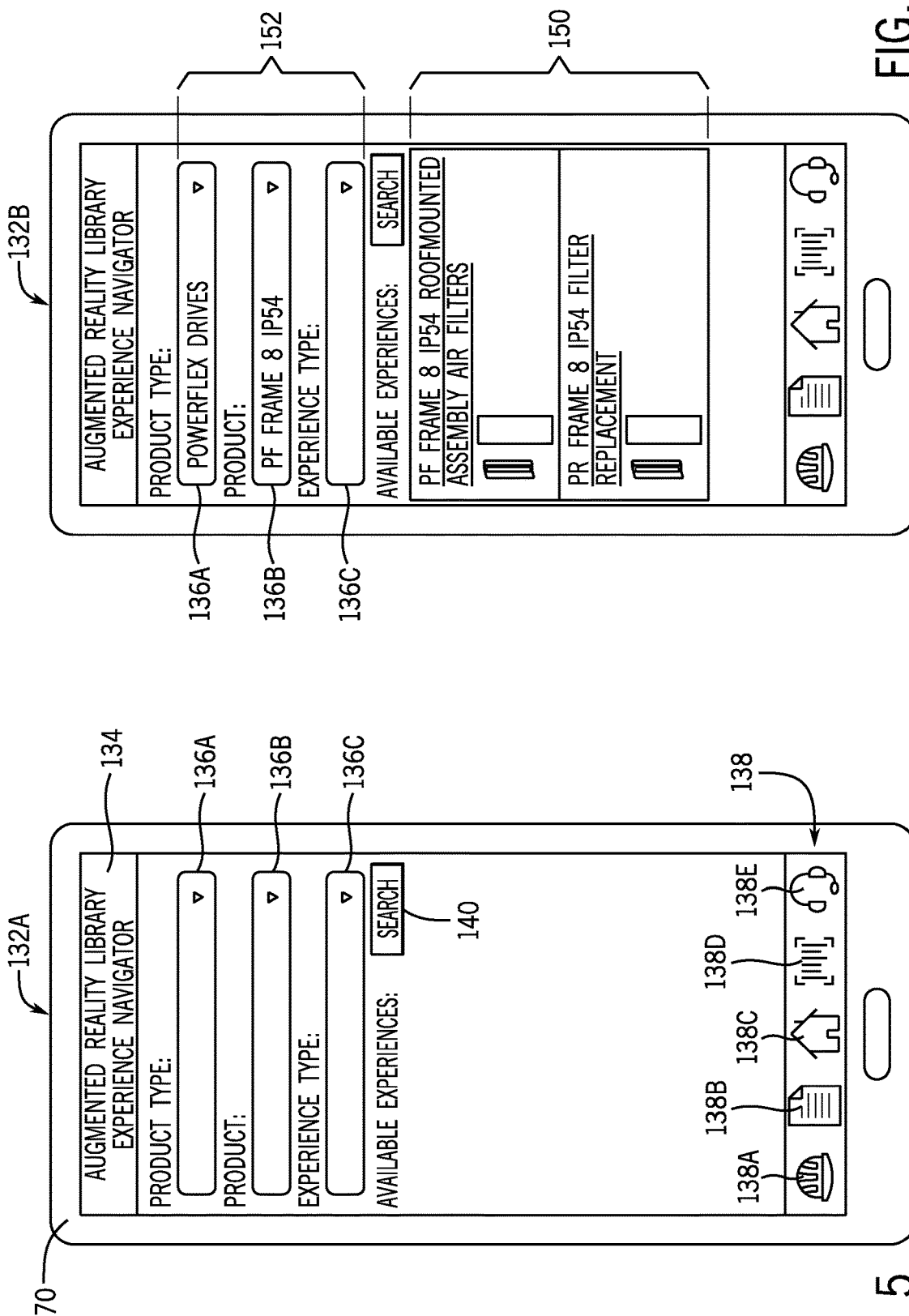
FIG. 5 is an illustration of a first example graphical user interface (GUI) of the electronic device of FIG. 3, in accordance with an embodiment.
FIG. 6 is an illustration of a second example GUI of the electronic device of FIG. 3, in accordance with an embodiment.

FIG. 5 is an illustration of a first example experience navigator (EN) application graphical user interface (GUI) 132A of the operator device 54 after block 112 of the method 110. At block 112, the operator device 54 may receive the request for AR support. In some cases, the operator 50 may launch an application to initiate a request for AR support. The operator device 54 may receive the command to open the application and respond by running an experience navigator application (e.g., executing code that, when executed, provides the experience navigator application). The experience navigator application may render visualizations, such that an experience navigator portal 134 is rendered on the display 70.

The experience navigator portal 134 may enable the operator 50 to input query parameters. In response to receiving the query parameters, the operator device 54 may initiate a query of the AR UX system database 98 to retrieve a subset of AR UX workflows datasets relevant to the query parameters. The operator device 54 may present via its display 70 indications corresponding to each of the subset of the AR UX workflow datasets. Presentation of the indications may permit the operator 50 to select between the subset of AR UX workflow datasets a respective AR UX workflow instruction to download and/or render via the operator device 54. In this way, when the AR UX workflow dataset is selected via a selection of the indication, the operator device 54 may initiate a download of the selected AR UX workflow dataset. When at least a first portion of the selected AR UX workflow dataset is downloaded to the operator device 54, the operator device 54 may present an AR UX workflow visualization corresponding to the first portion of the AR UX workflow dataset. As will be appreciated, such as during discussion of FIG. 6, the indications corresponding to the AR UX workflow datasets may include selectable text describing the AR UX workflow dataset, selectable images describing the AR UX workflow dataset, or the like. Text or images describing the AR UX workflow dataset may correspond to a visualization of a product associated with the AR UX workflow dataset (e.g., a representation of a virtual product of the AR UX workflow dataset), an operation associated with AR UX workflow instructions of the AR UX workflow dataset, or the like. In this way, when rendering the indications corresponding to the AR UX workflow datasets, the operator device 54 may refer to a subset of information obtained by the AR UX system 82 when performing the query of the AR UX system database 98, such as one or more virtual products of the AR UX workflow dataset or an experience type corresponding to the AR UX workflow dataset.

To enable query parameter to be input, the experience navigator portal 134 may include option selectors 136 (e.g., selector 136A, selector 136B, selector 136C), such that each option selector 136 may include a drop-down menu storing a closed list of selectable options for the operator 50. In some embodiments, the selectors 136 may be radio buttons, input fields, or the like, to permit a variety of options for querying. Additionally or alternatively, rendering of the experience navigator portal 134 may include rendering of menu buttons 138 to assist with navigation through features of the experience navigator (EN) application. For example, menu button 138A may navigate the EN application GUI 132 to an operator profile and menu button 138B may navigate the EN application GUI 132 to an application information document that technically describes a related industrial automation device such as providing installation information, debugging information, components associated to the industrial automation device, or the like. The menu button 138C may navigate the EN application GUI 132 to a home page (e.g., represented by EN application GUI 132A), menu button 138D may navigate the EN application GUI 132 to a barcode (e.g., a QR code, a matrix barcode) and/or a radio frequency identification tag (RFID tag) scanner, menu button 138E may navigate the EN application GUI 132 to a customer service representative for support with performing an operation according to a AR UX workflow instruction and/or associated with the application.

After the operator 50 enters inputs into the EN application GUI 132A via the selectors 136 and initiates the query via search button 140, the EN application GUI 132A may update into an EN application GUI 132B. FIG. 6 is an illustration of a second example EN application GUI 132B of the operator device 54 after block 118 of the method 110. After block 118, the operator device 54 receives query results according to inputs transmitted to the AR UX system 82 (e.g., inputs received via selectors 136). The query may result in multiple AR UX workflow datasets and these multiple results may be transmitted from the AR UX system 82 to the operator device 54. In response to receiving the multiple query results, the operator device 54 may update the display 70 to present the EN application GUI 132B that includes indications of query results 150. Since the experience type was not specified in the query (e.g., represented by selected selectors 152), multiple experiences for the same product type and product are listed in the query results 150. In some embodiments, a subset of experiences available to be selected via the selector 136C may dynamically change based on the option selected via the selector 136A and/or the selector 136B. In this way, a first product may have four experiences available and a second product may have two of the four experiences available. When the operator 50 selects the second product, the two of the four experiences may be presented as options for the selector 136C, such that the operator 50 is not given the option to select unavailable experiences for the second product.

Figure 7:
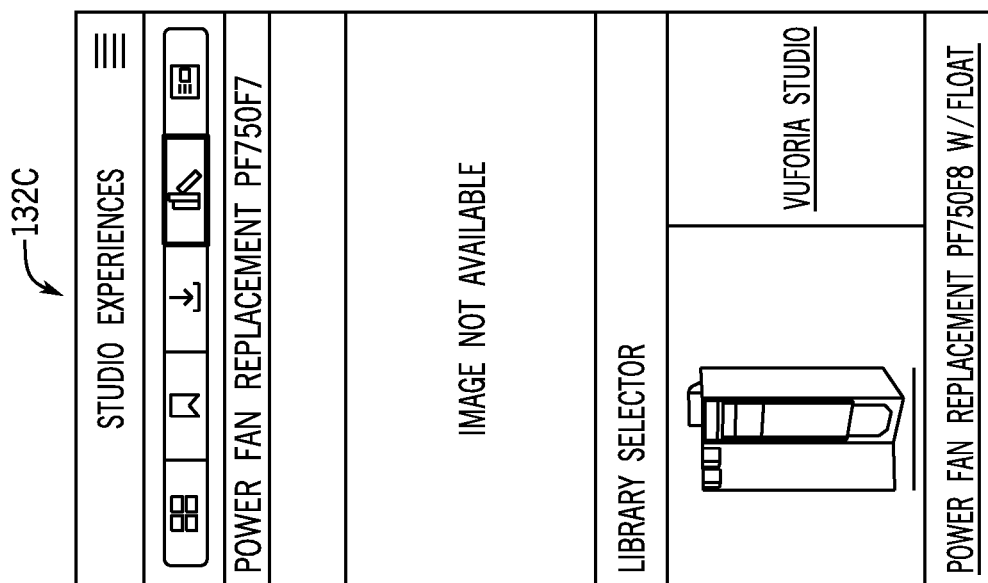
FIG. 7 is an illustration of a third example GUI of the electronic device of FIG. 3, in accordance with an embodiment.

FIGS. 7-12 depict additional features of the application discussed in FIG. 5 and FIG. 6. For example, FIG. 7 is an illustration of a third example EN application GUI 132C of the operator device 54. The EN application GUI 132C shows a library of AR UX workflow datasets available for selection.

Workflows that are accessed relatively more frequently than other workflows by the operator device 54 may be featured via the EN application GUI 132C for convenient access. In some embodiments, the AR UX system 82 may transmit AR UX workflow datasets to the operator device 54 in accordance with preventive maintenance schedules or according to determined access patterns by the operator device 54. The preventive maintenance schedules and/or the access patterns may be stored in the profile database 94 according to industrial automation system 10 and/or operator 50 profiles.

Figure 8:
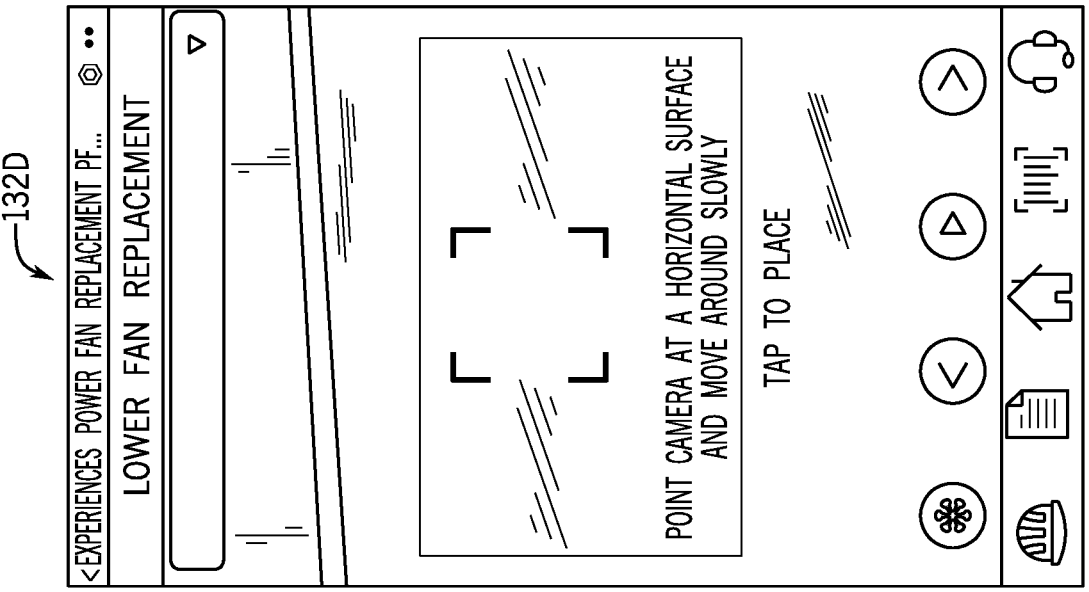
FIG. 8 is an illustration of an example visualization presented via a display of the electronic device of FIG. 3, in accordance with an embodiment.

After the AR UX workflow dataset is selected, the operator device 54 may initiate the presentation of AR UX workflow visualizations. Initiation of the AR UX workflow visualizations may include placement of a visualization 84 of the product type associated with the selected AR UX workflow dataset. FIG. 8 illustrates an example visualization presented via EN application GUI 132D. The EN application GUI 132D may be generated by the operator device 54 in response to initiating a display of the AR UX workflow visualizations at block 120. The AR UX workflow dataset may cause the operator device 54 to render animations of a visualization 84 of a virtual product that mimics operations of the procedure (e.g., physical modifications, physical adjustments) to be performed on the industrial automation device by the operator 50 in the real-world. To do so, the operator 50 may virtually place the virtual product on a real-world surface (e.g., "tap to place"). In this depicted example, the operator device 54 has received an AR UX workflow dataset associated with a "Lower Fan Replacement" experience (e.g., operational procedure) and has generated a visualization viewable by the operator 50 to guide the operator 50 through placing a virtual heatsink fan assembly on the floor (e.g., a real-world surface) in the real-world environment. As such, the AR UX workflow dataset includes visualization data (e.g., image data to be rendered) related to the selected workflow including visual representations of a device or component being maintained.

When the virtual product is placed, preliminary information may be displayed in a GUI by the operator device 54. FIG. 9 illustrates an EN application GUI 132E used by the operator device 54 to display preliminary information 162. Each AR UX workflow dataset may be associated with a data file used to generate a visualization (e.g., preliminary information 162) presented before animations associated with AR UX workflow instructions. Preliminary information 162 may include information such as precautionary information to be read before performing operations corresponding to AR UX workflow instructions, power down instructions to be performed before performing operations corresponding to AR UX workflow instructions, a tool listing corresponding to a list of equipment to be used when performing operations corresponding to AR UX workflow instructions, a continue button to indicate that preliminary information 162 has been reviewed, or the like.

Preliminary information 162 may include buttons 164 (e.g., button 164A, button 164B, button 164C, button 164D) to enable the operator 50 to navigate through information deemed useful for completing the AR UX workflow instructions corresponding to a placed virtual product 166. For example, selection of the button 164A may cause the operator device 54 to generate a GUI that indicates personal protective equipment requirements or other operational guidelines recommended to be followed while completing the AR UX workflow instructions. The button 164A may cause the operator device 54 to generate a GUI that indicates power down instructions for a product corresponding to the virtual product 166. For example, FIG. 10 illustrates an EN application GUI 132F used by the operator device 54 to display power down instructions 174 corresponding to the virtual product 166. In this example, the virtual product 166 corresponds to a "Heatsink Fan Assembly." It is noted that when other virtual products are placed as part of initiation of different AR UX workflow datasets, the visualization 84 used to represent the product as a virtual product as well as associated information (e.g., guidelines generated via button 164A, power down instructions generated via button 164B) may change.

Returning to FIG. 9, the button 164C may cause the operator device 54 to generate a GUI (e.g., an application GUI) that outlines tools to be used when completing the AR UX workflow instructions. For example, FIG. 11 illustrates an EN application GUI 132G used by the operator device 54 to display a tool listing 186 corresponding to AR UX workflow instructions for the virtual product 166. Returning to FIG. 9, the button 164D may cause the operator device 54 to generate a GUI that guides the operator 50 to perform the desired experience. The button 164D may be similar to a "continue" button or operation, where the operator device 54 waits to begin showing an AR UX workflow visualization of a first instruction until provided indication that the device to be operated on is in a no-power state or is otherwise ready to be operated on.

FIG. 12 illustrates an EN application GUI 132H used by the operator device 54 to display the AR UX workflow visualization for the virtual product 166. The EN application GUI 132H may include a selector 198 (e.g., a drop-down menu) that presents a list of operations associated with the AR UX workflow instructions to the operator 50 when selected. The list of operations indicated via the selector 198 may correspond to a list of operations specifically illustrated (e.g., highlighted, called-out) via the AR UX workflow visualizations. To start the rendering of AR UX workflow visualizations corresponding to the AR UX workflow instructions, the operator 50 may interact with a button 200. In response to receiving an input at the button 200, the operator device 54 may render a first AR UX workflow visualization. In FIG. 12, the virtual product 166 is considered a dropped device. The virtual product 166 may be a visualization 84 rendered as an overlaid three-dimensional image over an image data stream (e.g., live feed view of image data) received by the image sensor 66 of the operator device 54. As the operator device 54 rotates around the virtual product 166, a view of the virtual product 166 may update as well. In this sense, the virtual product 166 is locked in place after the device is virtually placed into the real-world view of the AR lens of the operator device 54.

To elaborate further on operations of the operator device 54 for presenting the AR UX workflow visualizations, FIG. 13 is a flowchart of a method 210 performed by the operator device 54 to receive and display the AR UX workflow visualizations. Although the method 210 is described below as performed by the operator device 54, it should be noted that the method 210 may be performed by any suitable processor that presents AR UX workflow visualizations. Moreover, although the following description of the method 210 is described in a particular order, it should be noted that the method 210 may be performed in any suitable order.

At block 212, the operator device 54 may display AR image data of an AR UX workflow dataset. The operator device 54 may receive the AR UX workflow dataset at block 120 of method 110 from the AR UX system 82. AR image data may correspond to a first portion of the AR UX workflow dataset to be presented by the operator device 54 on the display 70 and/or may correspond to each portion of the AR UX workflow dataset, and thus include the data corresponding to the first portion. When the AR image data corresponds to the first portion, the operator device 54 may receive additional portions of AR image data that correspond to subsequent portions of the AR UX workflow dataset at a later time but before presenting the additional portions. Displaying the AR image data may include displaying the AR image data corresponding to the first portion of the AR UX workflow dataset. The image rendered on the display 70 in response to presenting the AR image data may correspond to the EN application GUI 132D. As shown in the EN application GUI 132D, a portion of the AR image data may be rendered images that are static while a portion of the AR image data may correspond to a live-feed (e.g., real time video captured from the image sensor 66 of the operator device 54) of the ambient environment of the operator device 54. The operator 50 may have the option to physically move the operator device 54 around in the real-world to align virtual objects (e.g., virtual product 166, text) generated using the AR image data suitably with physical objects of the real-world.

For example, at block 214, the operator device 54 presenting the EN application GUI 132D may detect when a portion of a virtual object corresponding to the AR image data is aligned with an industrial automation device 20 of the real-world. The operator device 54 may detect the alignment when the portion of AR image data for the virtual object is aligned with a portion of data acquired via the image sensor 66 determined to correspond to the industrial automation device 20. When the virtual object is aligned with the industrial automation device 20, the AR environment may lock the virtual object to the industrial automation device 20.

In some embodiments, the virtual product 166 may be virtually positioned in the AR environment to overlay the physical industrial automation device 20 in the real-world (e.g., as seen via the AR environment). When this occurs, the virtual product 166 may, at block 216, be locked by the operator device 54 to the industrial automation device 20 in the AR environment. The operator device 54 may also automatically lock the virtual product 166 to the real-life industrial automation device 20. For example, the operator device 54 may use image recognition processes to detect where the specified industrial automation device 20 is within the real-time video stream and operate to render the virtual product 166 as overlaid or snapped to the industrial automation device 20. In some embodiments, image recognition techniques may be used to detect when the virtual object matches a real object. The detection may cause the operator device 54 to lock the virtual object to the real object.

When the virtual product 166 is locked to the industrial automation device 20, changes to the industrial automation device 20 in the real-world may be detected by the operator device 54 via the experience navigator application. The operator device 54 detecting changes to the industrial automation device 20 may enable the operator device 54 to notify the operator 50 when an operation was incorrectly performed (e.g., the wrong component being adjusted, an incorrect orientation of a component) and/or may identify when an operation was performed correctly such that the AR UX workflow may automatically progress to a subsequent AR UX workflow instruction. In response to detecting that an operation was incorrectly performed, the operator device 54 and/or the AR UX system 82 may adjust a color scheme of the AR UX workflow visualization to bring attention to the incorrect operation (e.g., change the color of the AR UX workflow visualization from a native color scheme of image data corresponding to the surrounding environment to a relatively higher contrast and/or a black and white color scheme). This change in color scheme may also occur when the operator device 54 detects that it has been moved into a barricade or moved outside a boundary virtually established for presentation and/or interaction with the AR UX workflow visualization.

Furthermore, when the virtual product 166 is locked to the industrial automation device 20, the virtual product 166 and the industrial automation device 20 may rotate similarly as the operator device 54 is moved around the industrial automation device 20 in the real-world. For example, the operator device 54 may initially be positioned to capture, via the image sensor 66, a first side of the industrial automation device 20 in the real-world and be rotated in the real-world to capture a second side of industrial automation device 20. When the operator device 54 is rotated to see the second side of the industrial automation device 20, the virtual product 166 tracks the rotation the industrial automation device 20 within the AR environment such that the second side of the virtual product is shown as overlaid to the second side of the industrial automation device 20.

In response to any locking of the virtual product 166 and/or any placement of virtual objects of the AR UX workflow dataset, at block 218, the operator device 54 may present AR UX workflow options. The options may correspond to additional information deemed relatively useful to include with operational instructions to be presented during the AR UX workflow. An example of AR UX workflow options may be shown via the EN application GUI 132E in FIG. 9. In the EN application GUI 132E, AR UX workflow options are presented as the preliminary information 162 which the operator 50 may use to navigate through the additional information for the AR UX workflow dataset.

When the operator device 54 receives an input corresponding to a depicted selectable option, the operator device may, at block 222, present information associated with the selection. For instance, the button 164D of EN application GUI 132E in FIG. 9 is associated with initiation of the AR UX workflow visualizations. After receiving this input, the operator device 54 may render a portion of the AR UX workflow visualizations corresponding to a first operation that the operator 50 is to perform as part of the AR UX workflow. In some embodiments, the AR UX workflow instructions do not immediately start at the first operation. For example, FIG. 12 depicted the selector 198 (e.g., a drop-down menu) that the operator 50 may use to start the first AR UX workflow instruction (e.g., by selecting the first operation from the drop-down list within the drop-down menu).

Figure 14:
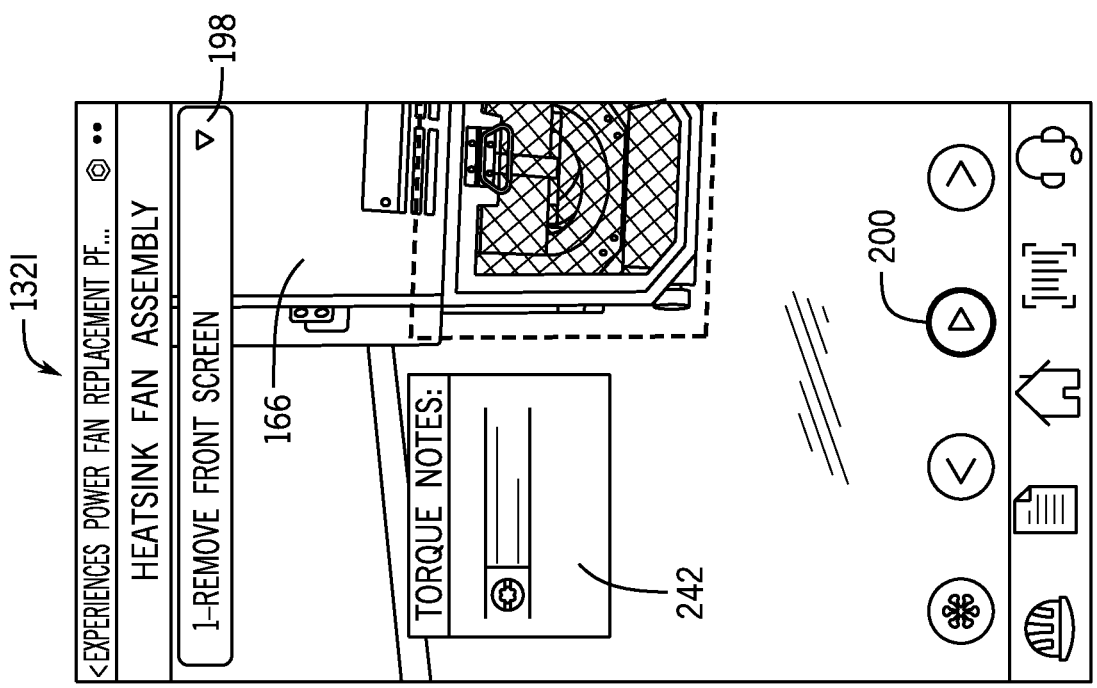
FIG. 14 is an illustration of an example visualization of notes presented via the display of the electronic device of FIG. 3, in accordance with an embodiment.

When the first operation is initiated (e.g., automatically, in response to an input at the selector 198), the operator device 54 may, at block 224, animate a portion of the AR UX workflow visualization corresponding to the first operation. The animation presented may mimic and show the operator 50 what physical manipulations to perform to the industrial automation device 20. For example, FIG. 14 illustrates an EN application GUI 132I used by the operator device 54 to animate an example operation of an example AR UX workflow. In FIG. 14, the example operation corresponds to "1-Remove Front Screen," captured in the selector 198. The virtual product 166, "Heatsink Fan Assembly," is to have its front screen removed as a result of the example operation of the AR UX workflow instruction. Thus, images rendered by the operator device 54 may guide the operator 50 through the operation. The images may be animated to improve how the operation is described to the operator 50 and sometimes the animations may start in response to an input being received via interaction with the button 200 (e.g., operator 50 pressing the button 200). Furthermore, additional product information 242 may be overlaid on images rendered that correspond to the ambient real-world. The additional product information 242 may provide details that might be useful to the operator 50 while performing the animated operation.

Figure 15:
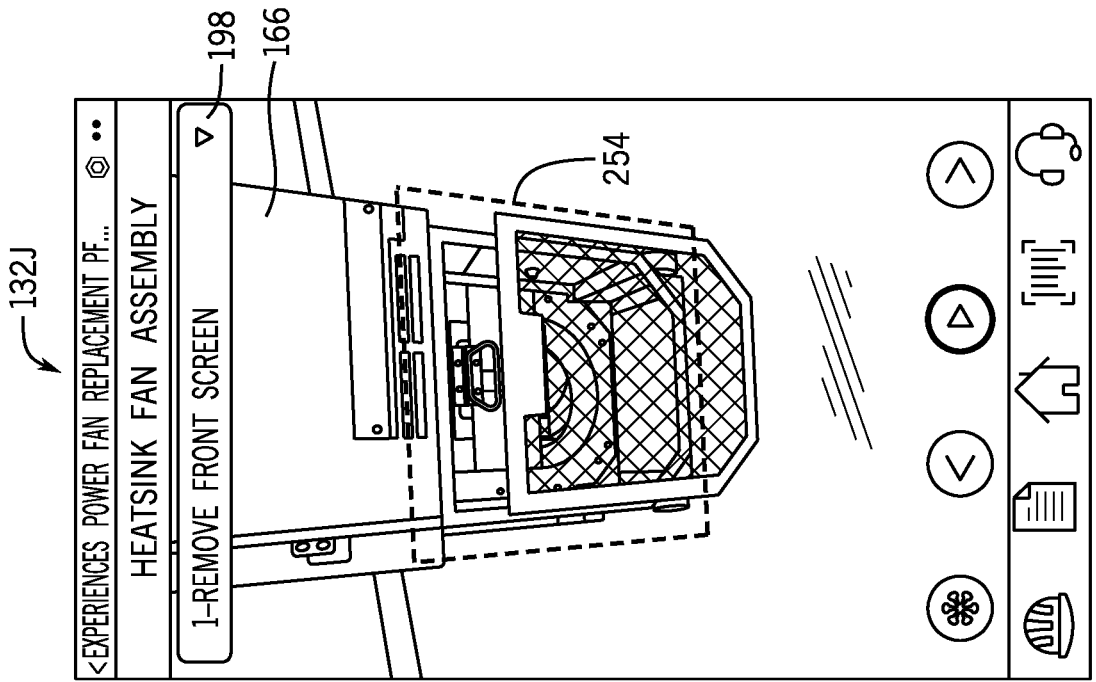
FIG. 15 is an illustration of an example visualization depicting a change in the industrial component presented via the display of the electronic device of FIG. 3, in accordance with an embodiment.

To elaborate on the animation, FIG. 15 illustrates an EN application GUI 132J used by the operator device 54 that animates the example operation described in FIG. 14. Comparing FIG. 14 to FIG. 15, the animation corresponding to the operation of removing the front screen from the heatsink fan assembly may result in the virtual product 166 being rendered by the operator device 54 as having the front screen partially removed to demonstrate the operation to be performed by the operator 50. Furthermore, emphasis graphics 254 may be used to highlight and draw attention to a portion of the virtual product 166 that is to be manipulated in the real-world through the current animation of the AR UX workflow visualization. In some embodiments, the emphasis graphics 254 may also be used to outline and/or define regions within which the operator 50 is permitted or recommended to move the operator device 54 around within to access the AR UX workflow dataset. These outlined and/or defined regions may correspond to operational zones within which additional personal protective equipment or additional precaution does not need to be taken by the operator 50. The operator 50, in response to viewing the animation represented by FIG. 14 and FIG. 15, may understand better which portion of the industrial automation device 20 to adjust per the AR UX workflow instruction.

Returning to FIG. 13, the operator device 54 may, at block 226, receive updated image data of the industrial automation device 20 from the image sensor 66, and use the updated image data, at block 226, to verify whether the operation instructed via the animation was suitably performed in the real-world and thus whether the AR UX workflow instruction was completed. For example, the operator device 54 may analyze the updated image data to detect whether the front screen was removed from industrial automation device 20. The operator device 54 may perform operations based on machine learning operations, artificial intelligence operations, or other suitable operations that may detect when an operation is suitably performed according to the AR UX workflow instruction. When the operator device 54 determines that the operation instructed is not completed, the operator device 54 may repeat analysis of captured image data at block 226 to determine when the operation is completed. In some cases, the operator device 54 may determine the operation was not completed as instructed and was indeed incorrectly performed (e.g., a part was installed upside, the wrong component was installed). In these cases, the operator device 54 may generate a notification to alert the operator 50 of the incorrect operation. This may help to reduce a likelihood of mis-operation propagating to further activities of the operator 50.

When the operator device 54 determines that the operation instructed at block 224 is completed, the operator device 54 may, at block 230, determine whether another portion to the AR UX workflow dataset is available for presentation via the display 70. The operator device 54 may reference the memory 60 or the storage 62 to retrieve any additional AR UX workflow data (e.g., AR image data) and/or may request additional AR UX workflow data (e.g., AR image data corresponding to a next portion of the AR UX workflow dataset) from the AR UX system 82.

When additional AR UX workflow data is available, the operator device may, at block 232, render and animate the subsequent AR UX workflow instruction. The additional AR UX workflow data may correspond to a second operation instructing a second adjustment to the industrial automation device 20 to be performed after the first operation instructing a first adjustment to the industrial automation device 20. This process of checking for and retrieving subsequent portions of the AR UX workflow dataset permits the operator device 54 to progress through the AR UX workflow instructions, and thus progress through providing instructions for the corresponding procedure (e.g., experience type) to the operator 50.

Figure 16:
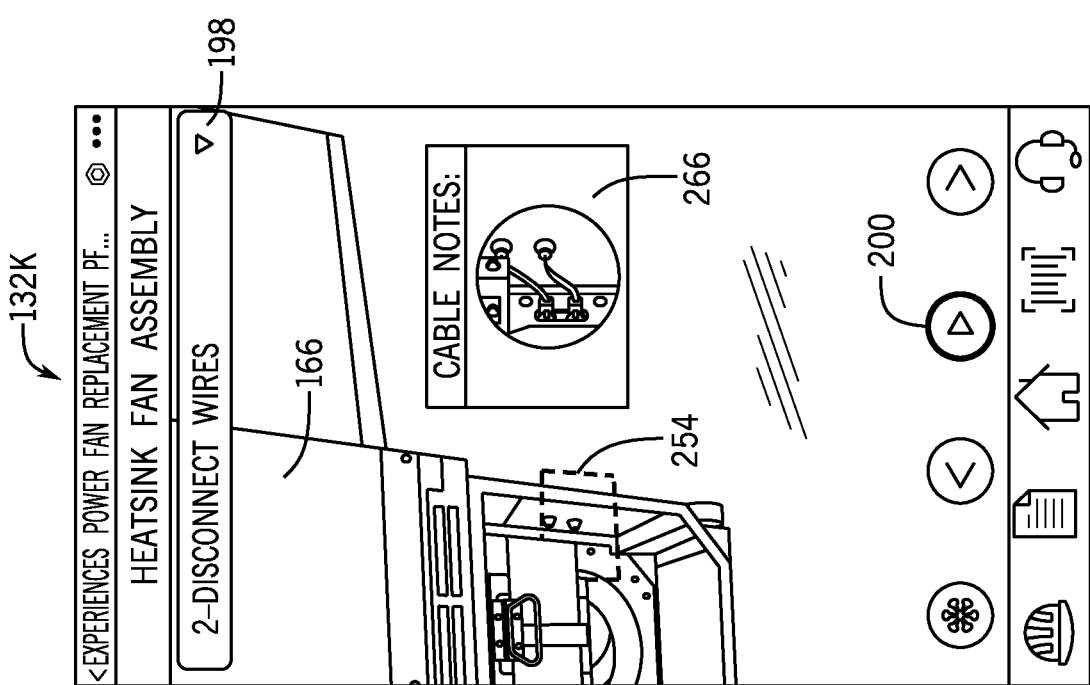
FIG. 16 is an illustration of an example visualization of additional notes presented via the display of the electronic device of FIG. 3, in accordance with an embodiment.

FIG. 16 illustrates an EN application GUI 132K used by the operator device 54 to animate a second example operation subsequent to the example operation described in FIG. 14. When the subsequent AR UX workflow visualization is rendered, the selector 198 may be visualized as advanced to a next option corresponding to the subsequent operation. In this example, the subsequent operation corresponds to "2-Disconnect wires." Similar to additional product information 242, additional product information 266 associated with disconnecting wires is presented via the EN application GUI 132K. Furthermore, the operator device 54 adjusted the rendering of the emphasis graphics 254 to emphasize a portion of the virtual product that corresponds to the subsequent operation (e.g., wires to be disconnected).

Returning to FIG. 13, when the subsequent portion is animated, the operator device 54 may, at block 226, receive updated image data of the industrial automation device 20 and verify that operations corresponding to the subsequent portion of the AR UX workflow instructions were suitably performed to the industrial automation device 20. For the example operation of FIG. 16, the operator device 54 may verify that the wires highlighted via emphasis graphics 254 were indeed disconnected. The operator device 54 may analyze the updated image data to detect whether the wires were disconnected. When the operator device 54 determines that the operations were performed in accordance with instructions presented at block 232, the operator device 54 may repeat the determination of whether there are subsequent portions of the AR UX workflow instructions to be displayed and whether any subsequent portions of the AR UX workflow instructions were performed by the operator.

In response to determining that each portion of the AR UX workflow instructions was correctly performed by the operator 50 to the industrial automation device 20, the operator device 54 may proceed to end presentation of the AR UX workflow instructions and, at block 234, update a profile corresponding to the operator device 54. The profile updated by the operator device 54 may indicate a most recent maintenance operation performed by the operator 50 corresponding to the operator device 54. The profile update may additionally or alternatively update a maintenance history corresponding to the industrial automation device 20. The maintenance history may indicate a time that the industrial automation device 20 was serviced by an operator (e.g., operator 50) and/or the specific operation that was performed to the industrial automation device 20 (e.g., component replacement, preventive maintenance, lock-out/tag-out operation). The maintenance history may be referenced by other industrial automation devices 20, control systems, or the like to determine whether the industrial automation device 20 is due for servicing (e.g., mechanical or electrical maintenance work) or the like.

As described above, the operator device 54 may render the selector 198 on the display 70 when providing the AR UX workflow visualizations. In some embodiments, the selector 198 may be used to navigate to different portions of the AR UX workflow instructions (e.g., between different animations of the AR UX workflow visualizations).

Figure 17:
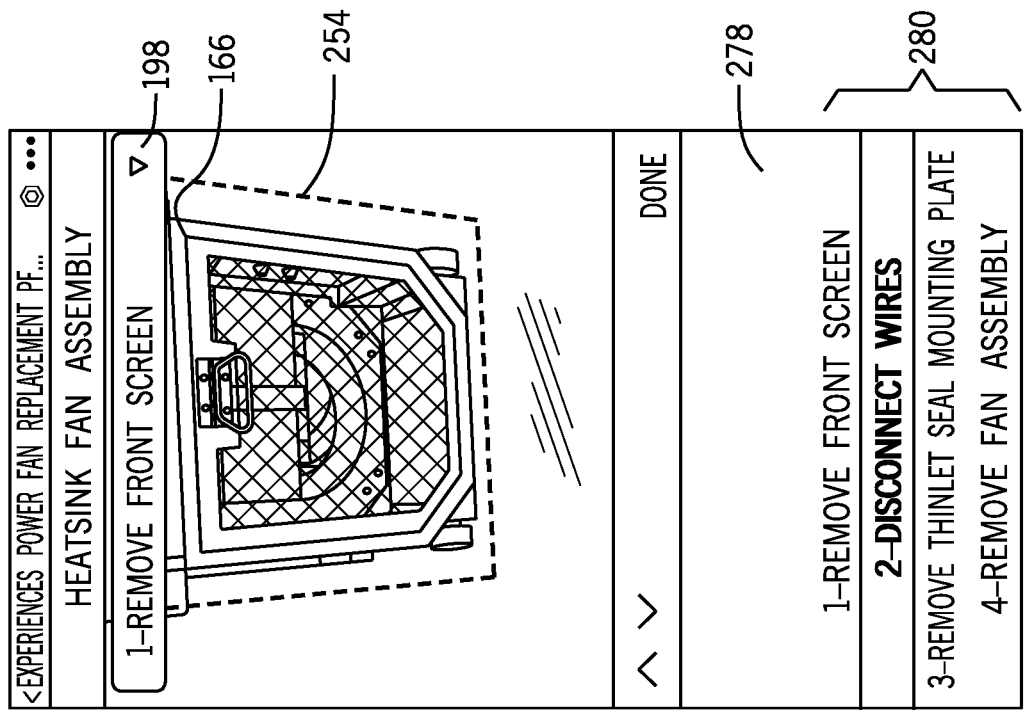
FIG. 17 is an illustration of an example visualization of a first step of a workflow presented via the display of the electronic device of FIG. 3, in accordance with an embodiment.

As an example, FIG. 17 illustrates an EN application GUI 132L used by the operator device 54 after receiving an indication to present each portion option of the AR UX workflow visualization via the selector 198. When the operator device 54 receives a selection at the selector 198 (e.g., operator 50 pressing the selector 198), the operator device 54 may render a selection menu 278 that outlines each of the operations of the AR UX workflow instructions (e.g., represented by indications 280). The operator device 54 may render the animation and/or portion of the AR UX workflow visualization corresponding to the particular operation when the particular operation is selected from the selection menu 278. As different operations are selected from the selection menu 278, the virtual product 166 may change renderings to match a final frame of an animation corresponding to a previous portion (e.g., one animated portion before the selected animated portion). For example, if the operation corresponding to "3-Remove thinlet seal mounting plate" was selected from the selection menu 278, the operator device 54 may update a rendering of the virtual product 166 to reflect what the virtual product 166 was previously rendered as at the end of the animation corresponding to "2-Disconnect wires."

Figure 19:
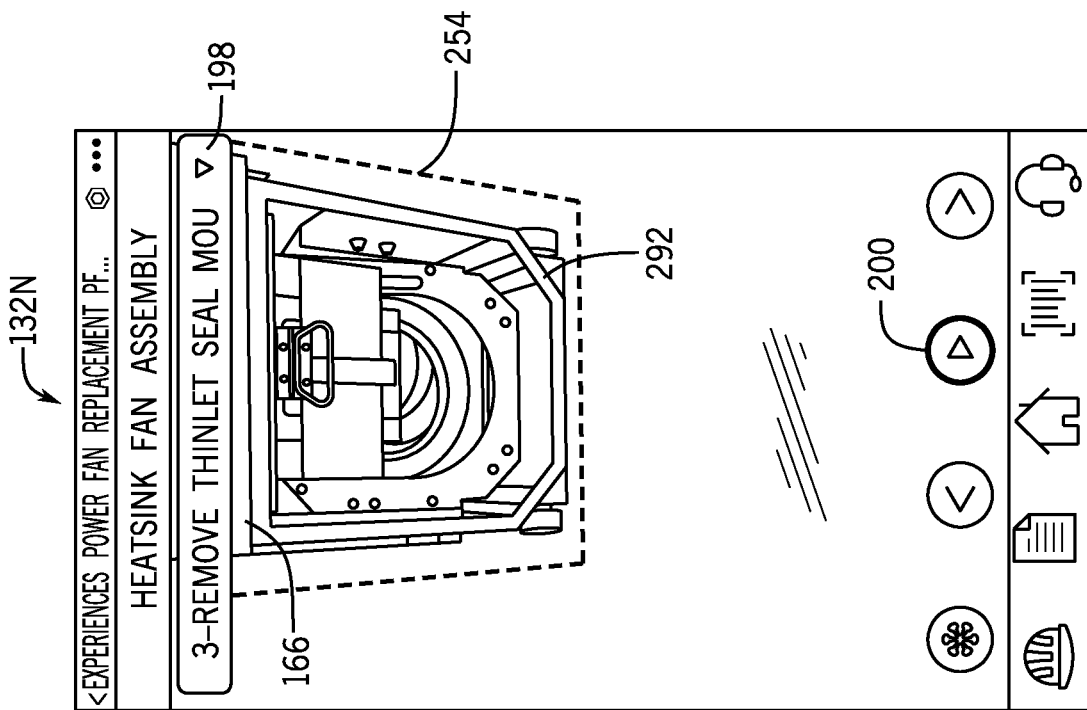
FIG. 19 is an illustration of an example visualization of a third step of a workflow presented via the display of the electronic device of FIG. 3, in accordance with an embodiment.
Figure 18:
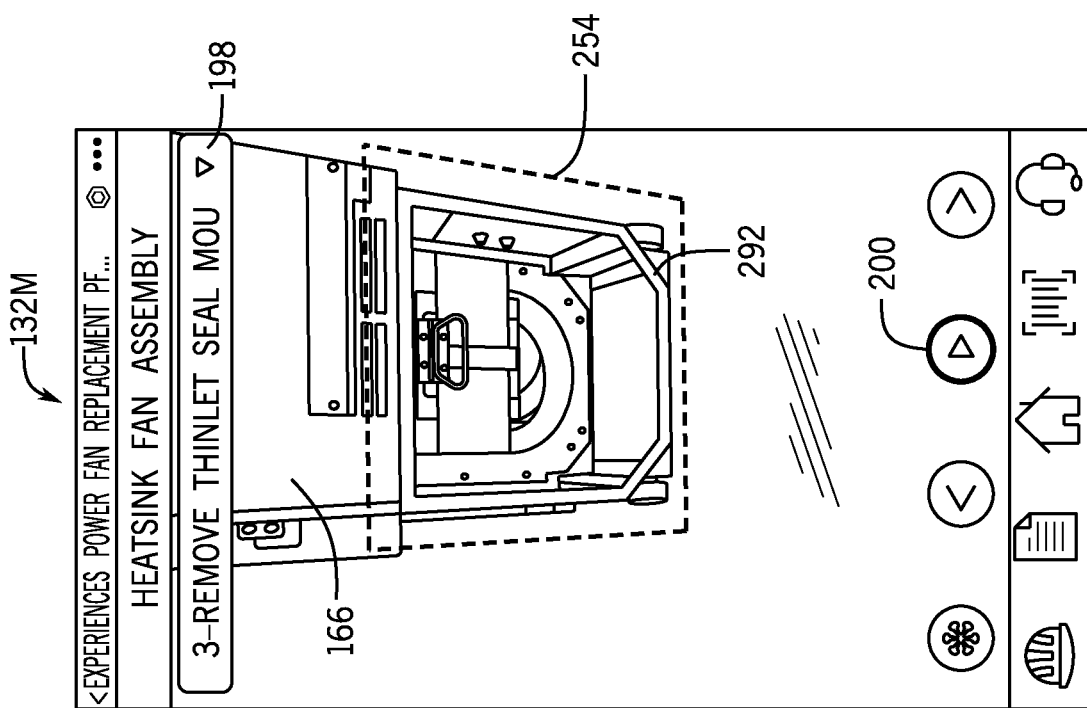
FIG. 18 is an illustration of an example visualization of a second step of a workflow presented via the display of the electronic device of FIG. 3, in accordance with an embodiment.
Figure 21:
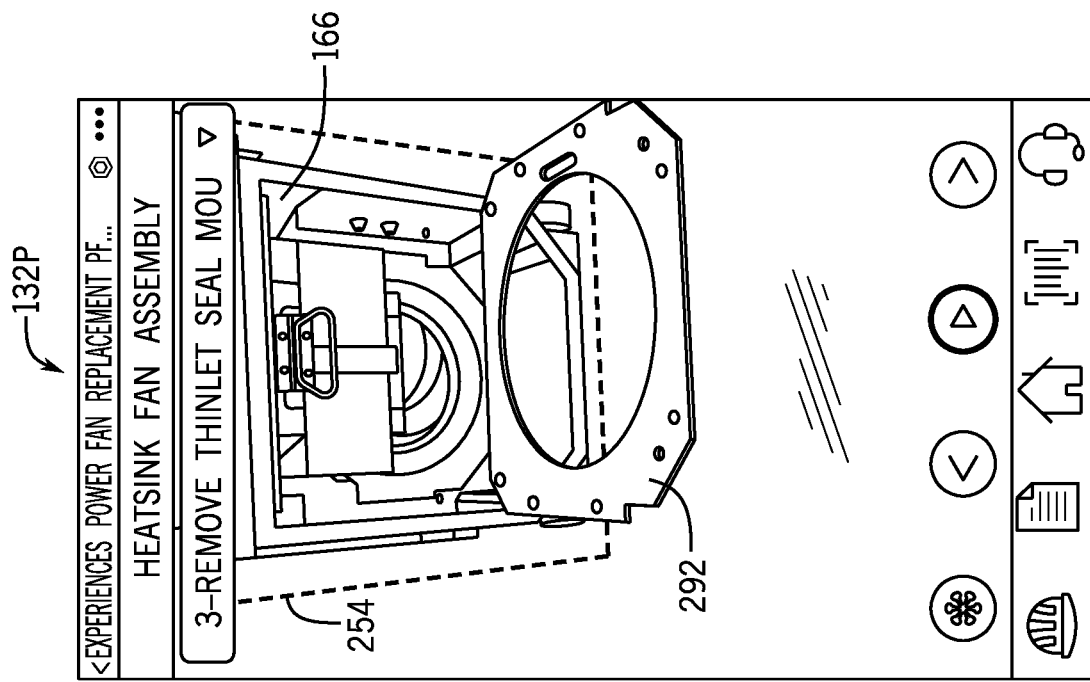
FIG. 21 is an illustration of an example visualization of a fifth step of a workflow presented via the display of the electronic device of FIG. 3, in accordance with an embodiment.
Figure 20:
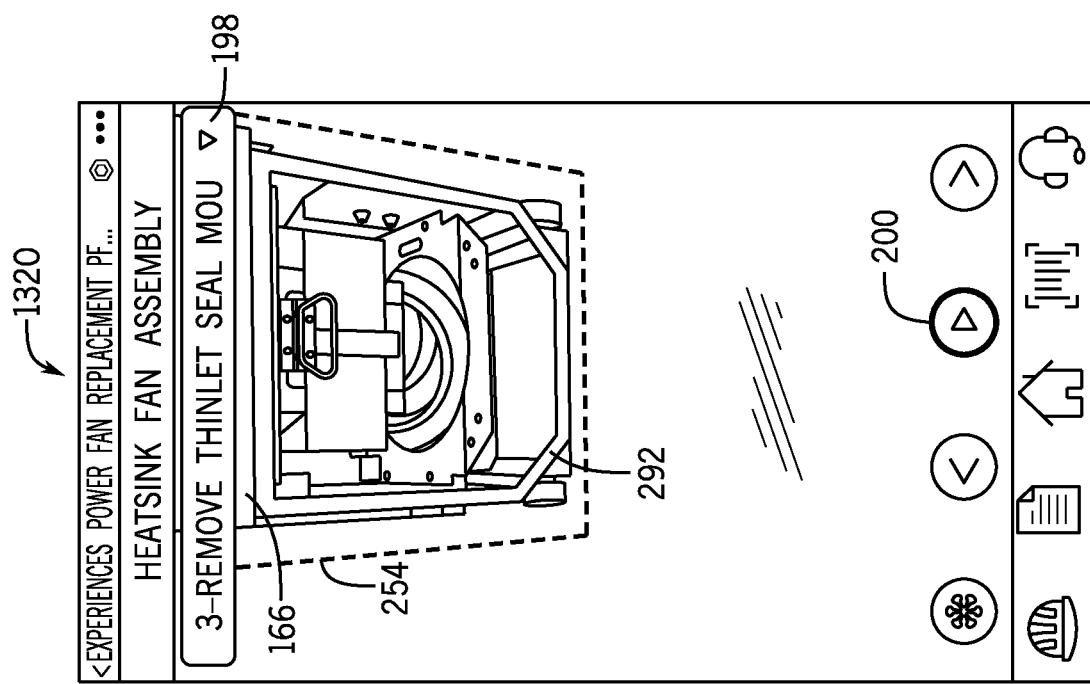
FIG. 20 is an illustration of an example visualization of a fourth step of a workflow presented via the display of the electronic device of FIG. 3, in accordance with an embodiment.

To elaborate on workflow animations, FIGS. 18-21 are illustrations corresponding to an example animation corresponding to operations for "3-Remove thinlet seal mounting plate." In particular, FIG. 18 illustrates an EN application GUI 132M of a subsequent step (e.g., a second step) after the EN application GUI 132N of FIG. 17, FIG. 19 illustrates an EN application GUI 132N of a third step of the AR UX workflow instructions, FIG. 20 illustrates an EN application GUI 132O of a fourth step of the AR UX workflow instructions, and FIG. 21 illustrates an EN application GUI 132P of a fifth step of the AR UX workflow instructions. For ease of description, FIGS. 18-21 are described together below.

The virtual product 166 may remain locked during the animation corresponding to "3-Remove thinlet seal mounting plate." In this way, the operator 50 may move the operator device 54 around and within a physical space nearby to the industrial automation device 20 while watching the AR UX workflow visualization. For example, the virtual product 166 remains at a same location within the AR environment as the operator device 54 is moved between views presented in FIG. 18 and FIG. 19. The animation of the AR UX workflow visualization may move components of the virtual product 166 to emphasize or highlight an operation to be performed to the industrial automation device 20. For example, a thinlet seal mounting plate 292 may be animated as being removed from the virtual product 166 via the sequence of the application GUIs 132M, 132N, 132O, 132P (e.g., FIGS. 18-21). The animation may cause the thinlet seal mounting plate 292 rendered in a first position (e.g., as shown in FIG. 18) to be rendered in a second position by the end of the animation (e.g., as shown in FIG. 21). It is noted that the emphasis graphics 254 may move during the animation and/or may remain locked relative to the virtual product 166 during the animation. In the depicted example animation, the emphasis graphics 254 remained locked to the virtual product 166 during the course of the animation.

Figure 22:
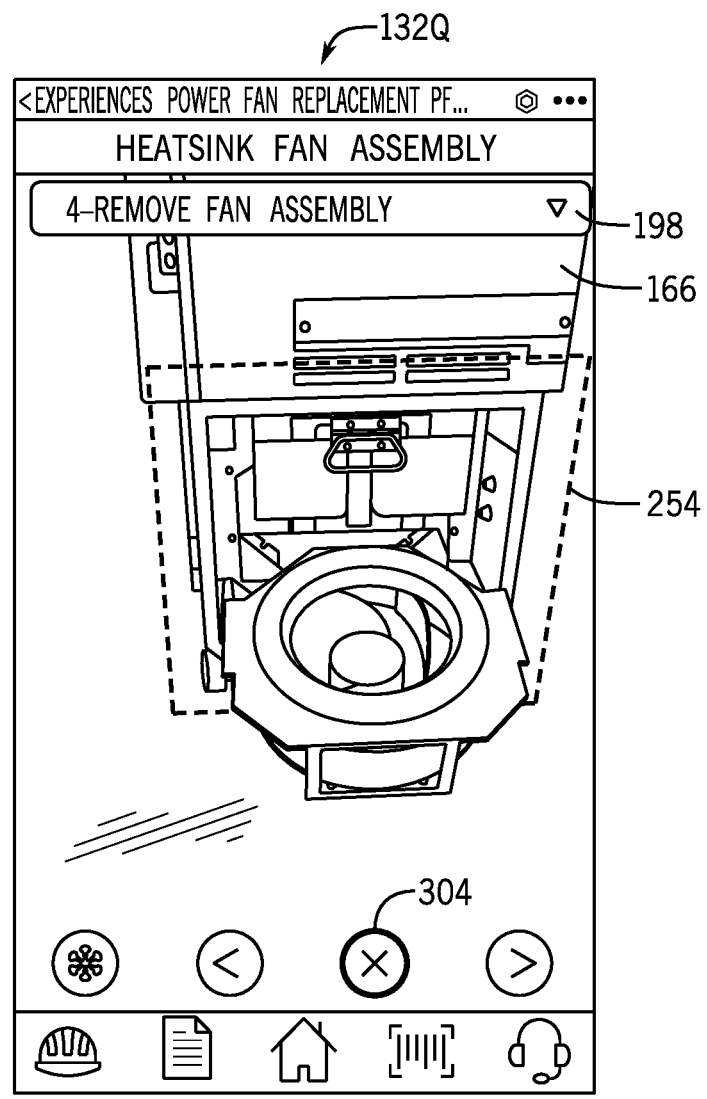
FIG. 22 is an illustration of an example visualization of a sixth step of a workflow presented via the display of the electronic device of FIG. 3, in accordance with an embodiment.

At the end of presenting each of the AR UX workflow instructions, the operator device 54 may render an exit button visualization. For example, FIG. 22 illustrates an EN application GUI 132Q of a sixth step of the AR UX workflow instructions. The EN application GUI 132Q includes a visualization of a stop button 304. The portion of the AR UX workflow instructions corresponding to "4-Remove Fan Assembly" may be at least partially depicted using the EN application GUI 132Q and may represent a last portion of the AR UX workflow instructions. The EN application GUI 132Q may correspond to a last frame of the animation. Since the animation is completed and the portion depicted is the last portion of the AR UX workflow instructions, the operator device 54 may render the stop button 304 to enable exit from the AR UX workflow instruction corresponding to the "Heatsink Fan Assembly." The operator device 54 may receive an input via the stop button 304 and, in response to the input, end presentation of the AR UX workflow visualizations.

In some embodiments, the operator 50 may request additional support while performing operations corresponding to AR UX workflow instructions on the industrial automation device 20. For example, the operator 50 may be unable to determine where a particular component is located, or which component to remove, or the like. To reduce a likelihood of mis-operation, the operator device 54 may render the menu button 138E (e.g., described in FIG. 5) to permit the operator 50 convenient access to a customer service representative. When the menu button 138E receives an input, the operator device 54 may render a communication portal to permit the customer service representative and the operator 50 to intercommunicate in real-time. The operator device 54 may additionally or alternatively telephonically connect the customer service representative and the operator 50 (e.g., via a voice chat or telephone call). In some cases, the customer service representative may use a computing device to transmit a modified AR UX workflow visualization to the operator device 54 as a way to help elaborate on a portion of the AR UX workflow instruction indicated by the operator 50 to be confusing.

To help elaborate, FIG. 23 is a block diagram of the operator device 54 receiving a modified AR UX workflow visualization from a customer service representative (CSR) device 316 associated with a customer service representative 318. Similar to other electronic devices described herein, the CSR device 316 may be any suitable computing device, such as a personal computing device, a laptop, a desktop, a smart phone, a cellular device, a tablet, a personal wearable device, or the like. The operator device 54 and the CSR device 316 may be communicatively coupled via the network 90. The operator device 54, in response to the menu button 138E receiving an input, may transmit the ongoing AR UX workflow dataset to the CSR device 316 (e.g., such as transmitting an actively rendered portion of the AR UX workflow dataset to the CSR device 316). In some embodiments, the operator device 54 may notify the AR UX system 82 associated with the menu button 138E receiving the input and cause the AR UX system 82 to provision an AR UX workflow visualization to both the CSR device 316 and the operator device 54 and/or to provision the ongoing AR UX workflow visualization to the CSR device 316 on behalf of the operator device 54. The AR UX system 82 may provide the AR UX workflow visualization to the CSR device 316 from the AR UX system database 98.

When the CSR device 316 receives data for the AR UX workflow visualization, the CSR device 316 may render at least a portion of the AR UX workflow visualization on a display 70, such that the customer service representative 318 may follow along as the operator 50 interacts with the AR UX workflow visualization rendered by the operator device 54. In some embodiments, the CSR device 316 and the operator device 54 may pass control of the AR UX workflow visualization between the CSR device 316 and the operator device 54, such that not more than one device is able to affect the AR UX workflow visualization at a time. In these cases, changes made via the CSR device 316 or the operator device 54 may be rendered automatically in real-time by the other of the CSR device 316 or the operator device 54.

For example, the CSR device 316 may receive an input and convert the input into modifications overlaid on the AR UX workflow visualization and/or the AR environment. The input may be converted into overlaid text, overlaid chalk modifications, overlaid clipart or other geometric renderings, or other suitable visualizations to emphasize a portion of the AR UX workflow visualization.

To help illustrate, FIG. 24 illustrates an EN application GUI 132R depicting user graphic modifications overlaid on an AR UX workflow visualization being presented on the operator device 54 that may be rendered substantially simultaneously on the CSR device 316 and the operator device 54. In this way, when the CSR device 316 receives an input and generates a chalk modification 326 in response to the input, the operator device 54 may receive the chalk modification 326 in real-time. The chalk modification 326 may be similar to the emphasis graphics 254 that draw attention to a particular portion of rendered real-time real-world images captured by the image sensor 66 of the operator device 54. For example, the operator 50 may ask the customer service representative 318 a question, such as, "which wire do I disconnect?" The customer service representative 318, in addition to any verbal response, may also provide a visual response via the chalk modification 326 to further elaborate on the point to be expressed to the operator 50. The operator device 54 and the CSR device 316 may intercommunication in a variety of suitable ways including text or voice communication natively supported by the type of device, such as when the operator device 54 and the CSR device 316 are cellular-capable electronic devices, communication via text messages (e.g., SMS, RMS), or through phone calls, may be permitted. In some embodiments, the operator device 54 and the CSR device 316 may communicate by sending voice recording via the AR UX system 82, by exchanging text, lines, clipart, shapes, or the like. Sometimes the text may include hyperlinks or links to information for reference while performing the AR UX workflow instruction. For example, the CSR device 316 may transmit a hyperlink to an additional workflow dataset to assist with performing the current AR UX workflow instruction.

The customer service representative 318 may freely move the CSR device 316 to interact with its AR environment independent of the AR environment or relative location of the operator 54. When any modifications generated by the CSR device 316 and rendered on the AR UX workflow visualization of the operator device 54 are disposed in a portion of the AR environment outside of a portion of the AR environment rendered on the operator device 54, the operator device 54 may generate icons and/or may use haptic feedback to guide the operator 50 to position the operator device 54 within the real-world. For example, a customer service representative 318 may place haptic feedback into the AR environment as associated with a portion of the AR UX workflow visualization to help guide the operator 50 to rotate the operator device 54 toward the placed haptic feedback indicator. The AR UX system 82 may receive a haptic feedback placement from the CSR device 316 indicative of a relative placement of the haptic feedback into the AR environment generated via the CSR device 316. The AR UX system 82 may update a portion of the AR UX workflow dataset and transmit the updated portion to the operator device 54. The operator device 54, in response to receiving the updated portion of the AR UX workflow dataset, may render the updated portion of the AR UX workflow dataset. Rendering the updated portion may cause the operator device 54 to provide directional haptic feedback to guide a rotation of the image sensor 66 toward the location indicated via the haptic feedback placement.

In some embodiments, the CSR device 316 may provide audio feedback placement to the AR UX system 82 to communicate directionality via presentation of the AR UX visualization by the operator device 54. In some cases, the AR UX visualization may automatically generate feedback to be provided via the operator device 54 to guide the operator 50 to a region of the AR UX workflow visualization indicated via the CSR device 316. For example, the AR UX system 82 may receive image data from the operator device 54 and may determine a first directionality of a position in the real-world of the operator device 54 based at least in part on the image data (e.g., may determine a direction in which the operator device 54 is orientated in based on what is captured via the image data). The AR UX system 82 may determine a second directionality associated with an input into the image data rendered on the display 70 of the CSR device 316 (e.g., to determine where the customer service representative 318 is instructing the operator 50 to view). The AR UX system 82 may generate an indication of feedback (e.g., haptic feedback, audio feedback) based at least in part on a difference between the first directionality and the second directionality, such as to guide a rotation or physical reorientation of the operator device 54 in the direction indicated by the feedback. The AR UX system 82 may transmit the indication of feedback to the operator device 54, which, in response, provides a directional indication (e.g., a directional noise, a directional vibration). The specific direction indicated by the directional indication, a pulse frequency, a pulse intensity, an audio file, an audible sound frequency, or the like, may be defined by data transmitted from the AR UX system 82 to the operator device 54 as part of the indication of feedback.

In some embodiments, the CSR device 316 may render two or more AR UX workflows visualizations for viewing and/or manipulation by the customer service representative 318. For example, the CSR device 316 may receive and render a first AR UX workflow visualization corresponding to the live video stream recorded via the operator device 54 and may receive and render a second AR UX workflow visualization corresponding to a copy AR environment locally placed by the CSR device 316. The customer service representative 318 may use the first AR UX workflow visualization to determine what the operator 50 is looking at or interacting with and may use the second AR UX workflow visualization to provide guidance to the operator 50. For example, the operator 50 may use the operator device 54 to drop an example virtual product 166 and initiate a corresponding AR UX workflow visualization, and in response to connecting with the operator device 54, the customer service representative may drop the example virtual product 166 and initiate a corresponding AR UX workflow visualization in a surrounding environment of the CSR device 316. In this way, the CSR device 316 may modify the AR UX workflow visualization for the example virtual product 166 in the AR environment corresponding to the CSR device 316 and just the modifications may be rendered on the AR UX workflow visualization of the operator device 54.

For example, the operator device 54 may display image data on its display 70. The CSR device 316 may display the image data displayed by the operator device 54 on a first portion of its display 70 and may display a locally maintained AR UX workflow visualization on a second portion of its display. When the operator device 54 updates its displayed image data, the CSR device 316 may mirror the update and also update the first portion of its display 70. In some cases, manipulations to the second portion of the display 70 of the CSR device 316 may be used to generate notifications, alerts, overlaid images, or the like to be presented via the display 70 of the operator device 54. In this way, the AR UX system 82 may receive an input from the CSR device 316 corresponding to a manipulation of the second portion of the display 70 of the CSR device 316. The AR UX system 82 may generate an adjusted AR UX workflow dataset based at least in part on the input from the CSR device 316 and may transmit the adjusted AR UX workflow dataset to the operator device 54 and to the CSR device 316. The operator device 54 may update its display 70 with a representation of the manipulation made to the second portion of the display 70 of the CSR device 316 in response to receiving the adjusted AR UX workflow dataset. In some cases, the CSR device 316 may update the first portion of its display 70 with the representation of the manipulation in response to receiving the adjusted AR UX workflow dataset from the AR UX system 82, such that presentation of the AR UX workflow visualizations is mirrored between the display 70 of the operator device 54 and the display 70 of the CSR device 316. The manipulation may include any suitable change or adjustment to the AR UX workflow visualization including, for example, audio feedback placement, haptic feedback placement, one or more lines, text, one or more overlaid images, or the like.

In some embodiments, the CSR device 316 may display the AR UX workflow visualizations at a delayed rate relative to displaying operations of the operator device 54 (or vice versa). In these cases, the AR UX system 82 may compensate for the processing and/or displaying delays by staggering transmission times of the portions of the AR UX workflow datasets to respective of the CSR device 316 and/or the operator device 54. For example, when the CSR device 316 displays AR UX workflow visualizations corresponding to the AR UX workflow dataset a duration of time before the operator device 54 displays the same AR UX workflow visualizations, the AR UX system 82 may transmit the AR UX workflow dataset to the operator device 54 at a leading time equal to the duration of time (e.g., at a time selected to compensate for the duration of time difference between displaying operations), such that the AR UX workflow visualizations are presented simultaneously on both the CSR device 316 and the operator device 54.

Keeping the foregoing in mind, in some embodiments, the AR UX system 82 may filter a subset of AR UX workflows visualization from the AR UX system database 98 before querying the AR UX system database 98 to make the query results relatively more relevant to the operator device 54. As described above, sometimes filtering is performed based at least in part on information stored in the location anchors database 96. Using location information to perform filtering may enable the AR UX system 82 to query a subset of AR UX workflow instructions that are associated with industrial automation devices 20 that are located closer or within a threshold distance from the operator device 54.

Technical effects of the present disclosure include techniques for facilitating the operation of an industrial automation system by an operator. An augmented reality (AR) environment may be provided via an operator device that provides animated instructions for the operator to reference when performing procedures to industrial automation devices of the industrial automation system. The operator device may render a first portion of an AR user experience (UX) workflow visualization, determine when an operation corresponding to the first portion of the AR UX workflow instruction is performed, and in response to the first portion being performed, may render a second portion of the AR UX workflow visualization subsequent to the first portion of the AR UX workflow visualization. In some embodiments, the operator device may communicate with a customer service representative device (CSR device) while the AR UX workflow visualization is being presented. The CSR device may provide inputs to be visually overlaid on the AR environment and a rendered portion of the AR UX workflow visualization as a way to present additional guidance to the operator using the operator device. Using AR UX workflows may improve operations of the industrial automation system by improving systems and methods used to provide procedural instructions to operators. As discussed herein, additional systems and methods may be used to improve the provision of AR UX workflow visualizations to the operator device, such as filtering an AR UX system database to be queried to reduce an amount of time to identify AR UX workflow visualizations to be rendered via the operator device.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

What is claimed is:

1. A system, comprising:
a processor; and
memory comprising computer-executable code that, when executed by the processor, causes the processor to:
retrieve a workflow dataset from a database based on a query input associated with an industrial automation device, wherein the workflow dataset comprises:
one or more instructions associated with one or more operations for the industrial automation device; and
one or more virtual objects associated with the one or more instructions and the industrial automation device;
transmit a first portion of the workflow dataset to a computing device, wherein the first portion of the workflow dataset is configured to present a first animation of a first virtual object of the one or more virtual objects, and wherein the first animation corresponds to performing a first instruction of the one or more instructions;
receive image data representative of the industrial automation device from an image sensor associated with the computing device;
determine that a first operation corresponding to the first portion of the workflow dataset is performed based on the image data; and
transmit a second portion of the workflow dataset to the computing device in response to determining that the first instruction is completed by comparing the image data with an additional image data from the image sensor.

2. The system of claim 1, wherein the computer-executable code that, when executed by the processor, causes the processor to determine that the first operation is performed comprises:
receiving first image data from the image sensor, wherein the first image data is representative of the industrial automation device before the first operation is performed;
receiving second image data from the image sensor, wherein the second image data is representative of the industrial automation device after the first operation is performed; and
determining that a difference between the first image data and the second image data is indicative of the first operation being performed.

3. The system of claim 1, wherein the first animation comprises:
rendering the first virtual object within an augmented reality environment at a first time; and
rendering a portion of the first virtual object being removed at a second time.

4. The system of claim 1, wherein the first animation comprises:
rendering the first virtual object within an augmented reality environment at a first time; and
rendering, at a second time, the first virtual object to be rotated relative to a position of the first virtual object at the first time.

5. The system of claim 1, wherein the computer-executable code that, when executed by the processor, causes the processor to determine that the first operation corresponding to the first portion of the workflow dataset is not performed at least in part by:
receiving the additional image data from the image sensor, wherein the additional image data is representative of the industrial automation device after transmitting the first portion of the workflow dataset; and
determining that the first operation corresponding to the first portion of the workflow dataset is not performed based on a difference between the image data and the additional image data.

6. The system of claim 1, wherein the computer-executable code that, when executed by the processor, causes the processor to transmit a third portion of the workflow dataset to the computing device before transmitting the first portion, and wherein the third portion of the workflow dataset is configured to present preliminary information associated with the workflow dataset.

7. The system of claim 6, wherein the preliminary information comprises one or more guidelines regarding performing the one or more operations instructed via the one or more instructions.

8. The system of claim 6, wherein the computer-executable code that, when executed by the processor, causes the processor to transmit the first portion of the workflow dataset to the computing device in response to receiving an input at the computing device.

9. The system of claim 1, wherein the computer-executable code that, when executed by the processor, causes the processor to transmit a third portion of the workflow dataset to the computing device before transmitting the first portion, wherein the third portion of the workflow dataset is configured cause the computing device to render a visualization indicative of instructions for powering down the industrial automation device, and wherein the visualization is overlaid on the image data.

10. The system of claim 1, wherein the computer-executable code that, when executed by the processor, causes the processor to transmit a third portion of the workflow dataset to the computing device before transmitting the first portion, wherein the third portion of the workflow dataset is configured cause the computing device to render a visualization representative of a list of tools associated with performing the first operation, and wherein the visualization is overlaid on the image data.

11. A method, comprising:
retrieving, via a processor, a workflow dataset from a database based on a query input associated with an industrial automation device, wherein the workflow dataset comprises:
one or more instructions associated with one or more operations for the industrial automation device; and
one or more virtual objects associated with the one or more instructions and the industrial automation device;
transmitting, via the processor, a first portion of the workflow dataset to a computing device, wherein the first portion of the workflow dataset is configured to present a first animation of a first virtual object of the one or more virtual objects, and wherein the first animation corresponds to performing a first instruction of the one or more instructions;
receiving, via the processor, image data representative of the industrial automation device from an image sensor associated with the computing device;
determining, via the processor, that a first operation corresponding to the first portion of the workflow dataset is performed based on the image data; and
transmitting, via the processor, a second portion of the workflow dataset to the computing device in response to determining that the first instruction is completed by comparing the image data with an additional image data from the image sensor.

12. The method of claim 11, wherein the first animation is presented after the first virtual object is locked to a portion of the image data that corresponds to the industrial automation device.

13. The method of claim 11, comprising:
receiving additional image data representative of the industrial automation device from an adjusted viewing angle with respect to the image data;
determining that the computing device was rotated;
generating a third portion of the workflow dataset corresponding to the first animation as viewed from the adjusted viewing angle in response to determining that the computing device was rotated; and
transmitting the third portion of the workflow dataset to the computing device.

14. The method of claim 11, wherein transmitting the first portion of the workflow dataset to the computing device comprises presenting a visualization configured to emphasize a portion of the image data while the first animation is being presented.

15. A tangible, non-transitory computer-readable medium configured to store computer-executable code executable by a processor of a first computing device that, when executed by the processor, causes the first computing device to perform operations comprising:
retrieving a workflow dataset from a database based on a query input associated with an industrial automation device, wherein the workflow dataset comprises:
one or more instructions associated with one or more operations for the industrial automation device; and
one or more virtual objects associated with the one or more instructions and the industrial automation device;
transmitting a first portion of the workflow dataset to a second computing device, wherein the first portion of the workflow dataset is configured to present a first animation of a first virtual object of the one or more virtual objects, and wherein the first animation corresponds to performing a first instruction of the one or more instructions;
receiving image data representative of the industrial automation device from an image sensor associated with the second computing device;
determining that a first operation corresponding to the first portion of the workflow dataset is performed based on the image data; and
transmitting a second portion of the workflow dataset to the second computing device in response to determining that the first instruction is completed by comparing the image data with an additional image data from the image sensor.

16. The non-transitory computer-readable medium of claim 15, wherein the first portion of the workflow dataset is configured to cause the second computing device to provide a combination of visualizations and haptic feedback while the first animation is presented.

17. The non-transitory computer-readable medium of claim 15, wherein the first animation corresponds to removing a component from the first virtual object.

18. The non-transitory computer-readable medium of claim 15, wherein the first animation comprises installing a component to the first virtual object.

19. The non-transitory computer-readable medium of claim 15, the operations comprising:
receiving an input from the second computing device, wherein the input is indicative of an instruction to continue to a second instruction; and
in response to receiving the input, transmitting a third portion of the workflow dataset in response to determining that the second instruction corresponding to the second portion of the workflow is completed.

20. The non-transitory computer-readable medium of claim 15, the operations comprising:
transmitting a third portion of the workflow dataset to the second computing device, wherein the third portion of the workflow dataset is configured to present a visualization of a selectable option, and wherein the visualization is configured to receive an input at the selectable option instructing that the third portion of the workflow dataset is generated.

* * * * *